(12) United States Patent
Arakawa

(10) Patent No.: US 7,335,836 B2
(45) Date of Patent: Feb. 26, 2008

(54) POWER SUPPLY WIRE, WIRE GRIP, ELECTRIC APPLIANCE SUSPENDING DEVICE, AND ELECTRIC APPLIANCE SUSPENDING METHOD

(75) Inventor: Hideo Arakawa, Tokyo (JP)

(73) Assignee: A.G.K., Ltd., Tokorozawa-shi (JP)

( * ) Notice: Subject to any disclaimer, the term of this patent is extended or adjusted under 35 U.S.C. 154(b) by 216 days.

(21) Appl. No.: 10/531,712

(22) PCT Filed: Oct. 20, 2003

(86) PCT No.: PCT/JP03/13374

§ 371 (c)(1),
(2), (4) Date: Apr. 18, 2005

(87) PCT Pub. No.: WO2004/036115

PCT Pub. Date: Apr. 29, 2004

(65) Prior Publication Data

US 2006/0000634 A1 Jan. 5, 2006

(30) Foreign Application Priority Data

Oct. 21, 2002 (JP) .............................. 2002-305527

(51) Int. Cl.
*H01B 7/34* (2006.01)
(52) U.S. Cl. ....................................................... 174/36
(58) Field of Classification Search ............ 174/102 R, 174/102 A, 103, 106 R, 108, 110 R, 113 R See application file for complete search history.

(56) References Cited

U.S. PATENT DOCUMENTS 2,953,627 A * 9/1960 Malneritch et al. ..... 174/102 R (Continued)

FOREIGN PATENT DOCUMENTS

JP 60-153432 U 10/1985

(Continued)

OTHER PUBLICATIONS

Microfilm of the specification and drawings attached to the Japanese Utility Model Application No. 151778/1986 (Laid-Open No. 66553/1987) (Tejiro Matsuda); Apr. 24, 1987.

(Continued)

*Primary Examiner*—William H. Mayo, III
(74) *Attorney, Agent, or Firm*—Frishauf, Holtz, Goodman & Chick, P.C.

(57) ABSTRACT

The electrical apparatus suspension unit 1 is provided with two power supply wires 20-1 and 20-2 by which the electrical apparatus 3 is conducted and suspended from the ceiling 5. Each of the wires 20 is connected to the hung member of the electrical apparatus 3 at the lower end by the a lower holder 40, and connected to the rail 9 laid on the ceiling 5 at the upper end by an upper holder 100. The power supply wire 20 comprises a core wire 21, an insulating layer 23 covering the core wire 21 and an outer layer 25 covering the insulating layer 23. The core wire 21 of the power supply wire 20-1 conducts to a grounded conductor cable W1 and the core wire 21 of another power supply wire 20-2 conducts to a voltage applied conductor cable W2. The power supply wires 20 having high tensile strength enables to suspend the electrical apparatus and also supply power thereto.

10 Claims, 31 Drawing Sheets

U.S. PATENT DOCUMENTS

| | | | | |
|---|---|---|---|---|
| 3,259,675 | A | * | 7/1966 | Bowers ...................... 264/103 |
| 3,634,607 | A | * | 1/1972 | Coleman ................. 174/120 R |
| 3,773,109 | A | * | 11/1973 | Eberline .................. 340/855.1 |
| 3,784,732 | A | * | 1/1974 | Whitfill, Jr. .................. 174/108 |
| 3,980,808 | A | * | 9/1976 | Kikuchi et al. ........ 174/110 SR |
| 4,033,800 | A | * | 7/1977 | Ollis ............................ 156/48 |
| 4,077,022 | A | * | 2/1978 | Pitts, Jr. .......................... 333/1 |
| 4,250,351 | A | * | 2/1981 | Bridges .................. 174/106 R |
| 4,317,000 | A | * | 2/1982 | Ferer ........................ 174/70 R |
| 4,898,046 | A | * | 2/1990 | Mancewicz et al. ........ 74/502.5 |
| 6,960,724 | B2 | * | 11/2005 | Orlet et al. ............. 174/102 R |

FOREIGN PATENT DOCUMENTS

| | | |
|---|---|---|
| JP | 61-112511 A | 5/1986 |
| JP | 62-66553 U | 4/1987 |
| JP | 63-184915 U | 11/1988 |
| JP | 64-47256 U | 3/1989 |
| JP | 6-215638 A | 8/1994 |
| JP | 06-215638 A | 8/1994 |
| JP | 8-017247 A | 1/1996 |
| JP | 8-129905 A | 5/1996 |
| JP | 10-184814 A | 7/1998 |
| JP | 11-113702 A | 4/1999 |
| JP | 2000-82343 A | 3/2000 |
| JP | 2000-082343 A | 3/2000 |

OTHER PUBLICATIONS

Microfilm of the specification and drawings attached to the Japanese Utility Model Application No. 141696/1987 (Laid-Open No. 47256/1989) (Arakawa Giken Kogyo Kabushiki Kaisha); Mar. 23, 1989.

* cited by examiner

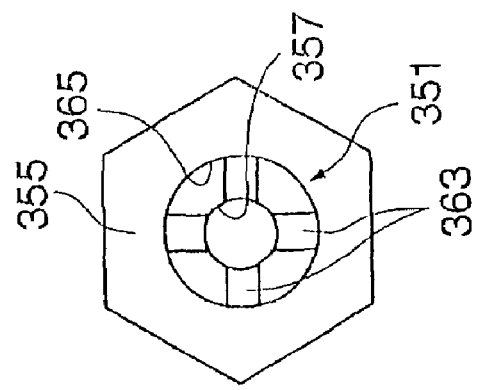
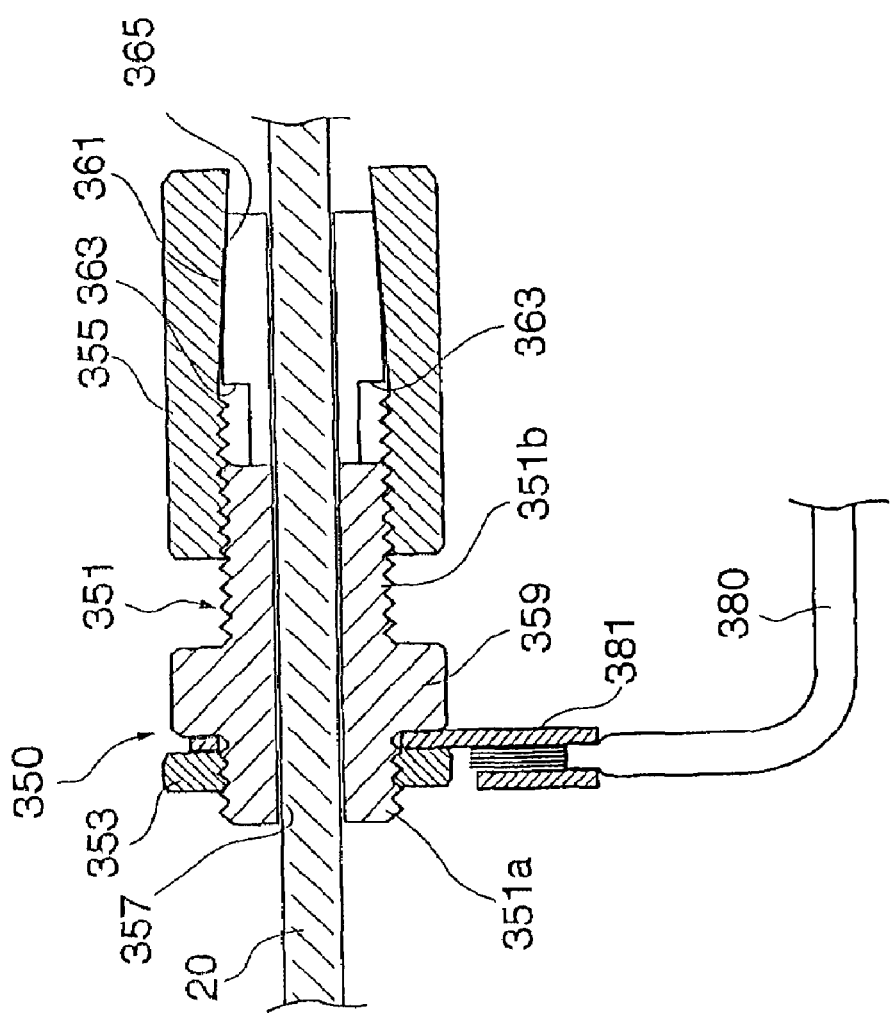

*FIG. 23B*     *FIG. 23A*     *FIG. 23C*
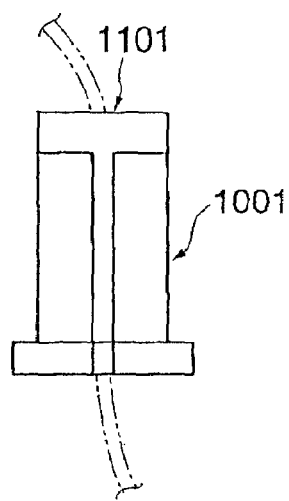 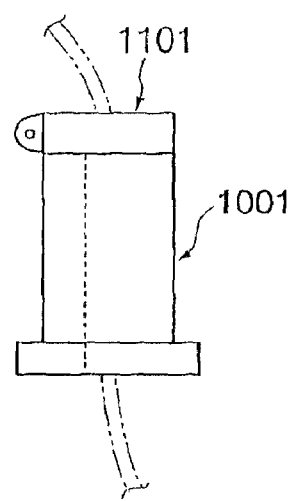 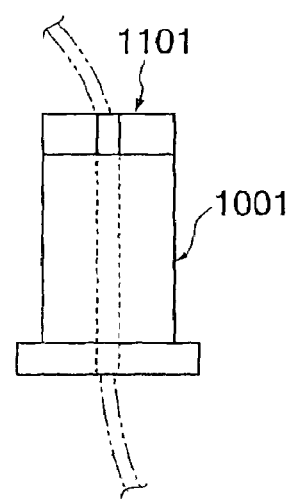
*FIG. 23D*
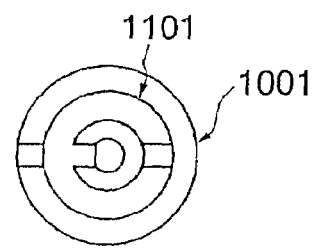

POWER SUPPLY WIRE, WIRE GRIP, ELECTRIC APPLIANCE SUSPENDING DEVICE, AND ELECTRIC APPLIANCE SUSPENDING METHOD

This application is a U.S. National Phase Application under 35 USC 371 of International Application PCT/JP2003/013374 filed Oct. 20, 2003.

FIELD OF THE INVENTION

The present invention relates to a power supply wire capable of serving as suspending an electrical apparatus as well as power-supplying thereto. Furthermore, the present invention relates to an electrical apparatus suspension unit comprising the power supply wire, a wire grip for connecting the wire and the like.

BACKGROUND OF THE INVENTION

In order to suspend a lighting apparatus from a ceiling, a single suspension cord unitizing a suspension string (a reinforced member) and a power supply cable is employed. In such a case, since the suspension cord serves as power supplying to the lighting apparatus as well as supporting the weight thereof, it is easily installed. And, such the suspension cord has a simple good appearance.

An exemplary suspending cord for an electrical apparatus is disclosed in Japanese Patent Publication No. H08-129905, in which a power supply cord comprising a grounded conductor cable and a voltage-applied conductor cable extending in parallel is covered with an insulating layer such as resin and fabric at the outer surface thereof. In order to supply electrical power enough for operating the lighting apparatus, such the conductor cables are made by using a stranded wire of a high conductive material such as copper. However, since such a conductor cable has small tensile strength and therefore cannot support a load of several kilograms or more, it enables suspending only a lightweight apparatus such as a household lighting. In addition, since the cord has a large diameter of about 5 mm or more, it is undesirable for suspending an elaborately designed lighting apparatus.

Another suspension wire capable of serving as a power supply wire as well as a signal wire is disclosed in Japanese Patent Publication No. H11-113702. The power supply wire serves as suspending an article, such as a picture and the like, as well as detecting a theft of the article. The wire is composed of a conductive core wire, an insulating layer being covered the outer surface of the conductive core wire and a conductive outer layer being covered the outer surface of the insulating layer. The conductive core wire and the conductive outer layer are made of a stranded wire having high tension. The conductive core wire and the conductive outer layer are electrically conducted at the distal ends thereof and connected to each of signal input terminals at the proximal ends so that the conductive core wire and the conductive outer layer can form a closed electrical circuit, which is live with weak electricity. The article such as a picture is securely held on the intermediate portion of the wire by using an additional grip.

When the wire is cut off at somewhere thereof so as to detach the picture therefrom, a conduction between the conductive core wire and the conductive outer layer will be shut off, resulting in opening the circuit having an alarm unit. When the circuit is opened, the alarm unit announces by sound or display that the wire is cut off.

The wire is able to suspend a comparatively heavy article such as a picture. However, a current which flows through the circuit is too weak to operate an electrical apparatus such as a lighting apparatus.

In general, when a current flows through a conductor cable, a dielectric current will be generated at a conduit of the conductor cable, resulting in heat generation. However, in a case of a power supply wire in which a bundle of a grounded conductor cable and a voltage-applied conductor cable extending in parallel is covered with an insulating layer such as resin and fabric at the outer surface thereof, currents of each conductor cable flows in opposite directions and induction fields are canceled each other, whereby the conduit does not generate heat. And, in a case of a power supply wire having a double ring structure comprising a conductive core wire and a conductive outer layer, which works as a grounded conductor cable and a voltage-applied conductor cable, an induction current generated by powering the grounded conductor cancels an induction current generated by powering the voltage-applied conductor cable. In addition, when the conduit is a nonconductor, an induction current is hardly generated.

In order to hold a lighting apparatus to such the power supply wire, a wire grip is employed. At this time, the wire grip is gripped at the intermediate portion of the wire and the lighting apparatus is securely held to the wire grip. Then, a terminal of the wire is connected to a terminal contact of the lighting apparatus in a manner such that a conductive core wire and the conductive outer layer are conducted to the terminal contacts of the lighting apparatus.

By the way, in such the power supply wire, a conductive outer layer may be made of a braided metal wire. The braided wire is made such that one of bundle of metal thin lines and another one of bundle of metal thin lines are braided alternatively. Such the braided wire has flexibility and contractility in the length direction. However, when the braided wire is cut off, it will loosen into the metal thin lines from the cut ends. In order to treat the cut end, first, the outer layer is slid (is ridden up) in the length direction of the wire so as to expose an insulating layer. Then, after the slid outer layer is fixed to the insulating layer by an insulating tape and the like, the insulating layer is stripped by using a nipper so as to expose a conductive core wire.

However, when the wire would be inserted through a wire-insertion bore of a wire grip with the treated end thereof in the lead, the wire would be twisted or the outer layer would become knobbed due to flexibility of the wire, resulting in that it is impossible to insert the wire through the wire-insertion bore with the end thereof in the lead. Accordingly, it is necessary to put a cap on the end. Putting the cap on the wire end requires a special tool, causing a lot of trouble. Accordingly, the braided wire with the both ends being treated in the aforesaid manner, having various predetermined lengths, must be employed. Accordingly, it is difficult to change the length of the wire when it is installed.

Japanese Utility Model Patent No. S64-47256 discloses a wire grip used for securely holding a shelf at the intermediate portion of a suspended wire. The wire grip has a slotted groove in the length direction thereof, in which the wire is inserted from the side surface of the wire grip and is securely gripped by the wire grip at the intermediate portion of the wire. Such type of the gripper is applicable to a power supply wire in which an outer layer is made of a flexible braided wire, however, it is necessary to insert the wire into the slotted groove while giving a tension to the wire. At this time, in a case of the outer layer made of a metal braided wire, even if the wire would be tensioned, the outer layer is slid with respect to the wire, whereby insertion of the wire is difficult.

In recent years, in response to popularization of a thin type liquid crystal television and utilization of a lighting apparatus for an elaborately designed structure or a display room of a shop, a suspension unit capable of suspending an electrical apparatus is on demand. To such suspension unit, sufficient strength and electrical safety are required.

SUMMARY OF THE INVENTION

Thus, an object of the present invention is to provide a power supply wire capable of serving as power supplying as well as suspending an electrical apparatus with high tensile strength. In addition, another object of the present invention is to provide a suspension unit and suspension method capable of suspending a heavy electrical apparatus such as a lighting apparatus, a liquid crystal display, a speaker and a microphone.

A power supply wire according to one embodiment of the present invention comprises a core wire comprising stranded wires made of copper alloy having high strength and high conductivity; an insulating layer covering said core wire; and an outer layer, comprising stranded wires made of nonmagnetic metal, covering said insulating layer.

In the present invention, employing a core wire having high strength and high conductivity as a conductor allows a single wire to serve as suspending a comparatively heavy electrical apparatus as well as power-supplying thereto. In such a case, using two wires allows simultaneous suspending the electrical apparatus and also supplying power thereto in a manner such that the core wire of one of the two wires serves as a voltage-applied conductor cable and the core wire of another serves as a grounded conductor cable. Using such a core wire having high conductivity makes it possible to pass a sufficient current to operate a high output electrical apparatus such as a lighting apparatus and a liquid crystal display. And, in addition to the high strength of the core wire, by selecting a material having high tensile strength as the outer layer made of nonmagnetic metal, sufficient suspension strength can be obtained. And, the wire having the aforesaid structure has a diameter narrower than a conventional wire in which a grounded conductor cable is arranged in parallel with a voltage-applied conductor cable, thereby to be easily installed and have a simple exterior.

In addition, since the outer layer is made of nonmagnetic metal (for example, nonmagnetic stainless steel), the outer layer would work as if a magnetic shield. Thus, an induction field is not generated, and therefore a conduit is hardly heated, whereby the wire may be safely used.

A power supply wire according to another embodiment of the present invention comprises a core wire comprising stranded wires made of copper alloy having high strength and high conductivity; an insulating layer covering said core wire; an outer layer, comprising stranded wires made of copper alloy having high strength and high conductivity, covering said insulating layer; and an outermost insulating layer covering said outer layer.

In the present invention, an outer layer of a power supply wire is also made of a material having high strength and high conductivity. In such a case, using a single power supply wire allows suspending an electrical apparatus and also supplying power thereto in a manner such that the core wire of the wire serves as a voltage-applied conductor cable and the outer layer thereof serves as a grounded conductor cable. At this time, an induction current generated on conducting to the core wire is canceled by an induction current generated on conducting the outer layer.

A wire grip according to the present invention comprises an inner sleeve having a wire-insertion bore for inserting a wire, a plurality of ball-set bores opened at both of said wire-insertion bore and an outer surface of said inner sleeve and a tapered outer surface which is formed at a portion where said ball-set bores are formed; a plurality of balls received in said ball-set bores and protruding partially into said wire-insertion bore so as to be pressed to said wire; an outer sleeve having a tapered inner surface which is contacted with said tapered outer surface of said inner sleeve so as to press said balls inwardly; and a spring for biasing said inner sleeve with respect to said outer sleeve in a direction in which the tapered outer surface is tapered down, wherein said ball-set bores are arranged at spaced-apart plural positions in an axis direction of said wire-insertion bore, and, said balls (a large-diameter ball and a small-diameter ball) received in said plural positions of ball-set bores have a diameter which varies according to positions of said ball-set bores.

In the present invention, the spring biases the inner sleeve in the direction in which the balls are pressed to the wire so that the wire will be held to the wire grip by the balls pressed thereto. In addition, in order to obtain a sufficient gripping force to suspend a heavy electrical apparatus, plural balls are arranged at the spaced plural positions. Assuming each of the balls being pressed to the wire with an equal force, plural balls will allow a total force by all of the balls to increase, while an individual force by one of the balls to decrease. Accordingly, even if the insulating layer is made of a soft material (for example, insulating plastic), the depth of the balls dug into the insulating layer is small. Therefore, the thickness of the insulating layer can be kept almost constant, thus, the insulating performance of the insulating layer can be well maintained.

In the present invention, it is preferable that each of said ball-set bores has a retainer portion for preventing excessive protrusion of said ball at the end thereof opened to said wire-insertion bore.

The present invention provides measure to prevent the balls from protruding excessively into the wire-insertion bore. Accordingly, the insulating performance of the core wire can be well maintained.

And, in the present invention, it is preferable that three large-diameter ball-set bores and three small-diameter ball-set bores are alternatively arranged at a same central angle around the axis of said inner sleeve.

In the present invention, a space required for forming plural ball-set bores can be smaller, resulting in downsizing the wire grip. And, the large-diameter balls and the small-diameter balls are alternately pressed around the wire while pressed at spaced plural positions in the length direction of the wire, thus, preventing the load by the balls from concentrating on one portion of the wire.

An electrical apparatus suspension unit according to the present invention comprises a plurality of power supply wires comprising a core wire comprising stranded wires made of copper alloy having high strength and high conductivity, an insulating layer covering said core wire and an outer layer comprising stranded wires made of nonmagnetic metal, covering said insulating layer; a lower holder for gripping a lower end portion of each of said power supply wires and being coupled to each of hung members of an electrical apparatus; and an upper holder for gripping an upper end portion of each of said power supply wires.

In the present invention, using two wires will perform suspending an electrical apparatus and also supplying power thereto in a manner such that the core wire of one wire serves as a voltage-applied conductor cable and the core wire of another wire serves as a grounded conductor cable. And, since the wire has high strength, it is possible to suspend a heavy electrical apparatus in safety.

In the present invention, it is preferable that at least two of a plurality of said power supply wires are connected such that upper ends and lower ends of said core wires thereof are connected to a terminal of said electrical apparatus and a power line, respectively.

In the present invention, the both ends of the wire may be terminated neatly.

An electrical apparatus suspension unit according to the present invention comprises a power supply wires comprising a core wire comprising stranded wires made of copper alloy having high strength and high conductivity, an insulating layer covering said core wire, an outer layer comprising stranded wires made of copper alloy having high strength and high conductivity, covering said insulating layer and an outermost insulating layer covering said outer layer, a lower holders for gripping a lower end portion of said power supply wire and being coupled to a hung member of an electrical apparatus; and an upper holder for gripping an upper end portion of said power supply wire.

In the present invention, in a case of an electrical apparatus operated at low voltage, a single wire will perform suspending and also power-supplying. Additionally providing an outermost layer which covers the outer layer will be able to suspend and power-supply to even an electrical apparatus operated at relatively high voltage by using s single wire.

In the present invention, it is preferable that said power supply wires are connected such that upper ends and lower ends of said core wire and said outer layer thereof are connected to a terminal of said electrical apparatus and a power line, respectively.

A wire grip according to another embodiment of the present invention comprises an inner sleeve having a wire-insertion bore for inserting a wire, a plurality of ball-set bores opened at both of said wire-insertion bore and an outer surface of said inner sleeve, and a tapered outer surface which is formed at a portion where said ball-set bores are formed; a plurality of balls received in said ball-set bores and protruding partially into said wire-insertion bore so as to be pressed to said wire; an outer sleeve having a tapered inner surface which is contacted with said tapered outer surface of said inner sleeve so as to press said balls inwardly; and a spring for biasing said inner sleeve with respect to said outer sleeve in the direction in which the tapered outer surface is tapered down, wherein each of said inner sleeve and said outer sleeve has a slotted groove communicated with said wire-insertion bore, and said wire grip further comprising a jig by which said wire is pushed into said slotted grooves.

When it is hard to insert the wire from the tip end through the wire-insertion bore, for example, in such a case that the tip end of the wire is not terminated (without a cap for terminating the end, the line constituting the wire is easily flayed or raveled), or in a case of a flexible wire having high flexibility, the intermediate portion of the wire shall be fitted into the wire-insertion bore from the side of the wire grip so as to be gripped to the wire grip. Accordingly, the wire is cut off at a desirable length during installation work for suspending electrical apparatuses and the wire can be easily held to the wire grip.

In the present invention, it is preferable that said jig comprises a sleeve pressing portion for pressing said inner sleeve in an opposed direction to a biasing direction of said spring, and a strip portion extending from said sleeve pressing portion and for pushing said wire into said slotted grooves.

Using the jig, the first operation and the second operation will be carried out simultaneously or continuously carry out, the first operation, in which the inner sleeve is pressed with respect to the outer sleeve in the opposed direction to the biasing direction of the spring so as to allow the balls to be moved outwardly from the wire-insertion bore, and the second operation, in which the wire is pushed into the wire-insertion bore through the slotted grooves, whereby the wire will be easily fitted into the wire-insertion bore of the wire grip.

An electrical apparatus suspension method for suspending an electrical apparatus according to the present invention is a method using a power supply wire comprising a core wire comprising stranded wires made of copper alloy having high strength and high conductivity, an insulating layer covering the core wire and outer layer comprising braided wires made of nonmagnetic metal and covering the insulating layer, in which the electrical apparatus is securely held to said wire by using a wire grip. And, the wire grip comprises an inner sleeve having a wire-insertion bore for inserting said wire, a plurality of ball-set bores opened at both of said wire-insertion bore and an outer surface of said inner sleeve and a tapered outer surface which is formed at a portion where said ball-set bores are formed; a plurality of balls received in said ball-set bores and protruding partially into said wire-insertion bore so as to be pressed to said wire; an outer sleeve having a tapered inner surface which is contacted with said tapered outer surface of said inner sleeve so as to press said balls inwardly; and a spring for biasing said inner sleeve with respect to said outer sleeve in a direction in which said tapered outer surface is tapered down, said wire grip further comprising a jig for pushing said wire into slotted grooves, which are formed at said inner sleeve and said outer sleeve and communicated with said wire-insertion bore, wherein said wire is fitted into said slotted grooves from the side surface of said wire grip and pushed into said slotted grooves by using said jig so that said wire can be held by said wire grip.

In the present invention, it is preferable that said method comprising cutting said wire at a desirable length; sliding said outer layer from the cut end in the length direction so as to expose said insulating layer; stripping said insulating layer so as to expose said core wire; and connecting said core wire to a terminal of the electrical apparatus and pushing said slid outer layer into said slotted grooves.

When the outer layer is formed of braided metal wires, it is preferable for easy handling that the wire is cut off at a desirable length and each of the cut ends is terminated with a cap, because the braided wire are easily contracted along the wire like a knob or loosened into thin wires, causing difficulty in inserting the wire from the cut end of the wire through the wire-insertion bore. Consequentially, the wire grip is formed with the slotted grooves and the jig is previously prepared. This will enable inserting the intermediate portion of the wire into the wire-insertion bore from the slotted grooves even when the wire has outer layer formed of braided wires. As a result, it is not necessary that the wire is previously cut off at a predetermined length and each cut end of the wire is terminated with a cap. Accordingly, it becomes possible that the wire is cut off at a desirable length corresponding to the actual suspension length and position of the electrical apparatus during installation work at the site where the electrical apparatuses are installed.

The wire having the outer layer formed of braided wires has an advantage in which the balls are caught between the lines, resulting in enhancing gripping force.

A wire grip according to another embodiment of the present invention comprises an inner sleeve having a wire-insertion bore for inserting a wire, a plurality of ball-set bores opened at both of said wire-insertion bore and an outer surface of said inner sleeve and a tapered outer surface which is formed at a portion where said ball-set bores are formed; a plurality of balls received in said ball-set bores and protruding partially into said wire-insertion bore so as to be pressed to said wire; an outer sleeve having a tapered inner surface which is contacted with said tapered outer surface of said inner sleeve so as to press said balls inwardly; and a spring for biasing said inner sleeve with respect to said outer surface in a direction in which said tapered outer surface is tapered down, wherein said balls are made of electrical insulating material.

When the balls are pressed to the outer surface of the wire so that the wire grip will be connected to the wire, the balls bite into the insulating layer being coated around the core wire. At this time, the thickness of the insulating layer becomes thinner, and therefore dielectric strength of the wire is likely to decrease. When the balls are made of electrical insulating material, since the balls themselves have insulating performance, dielectric strength can be prevented from decreasing. Examples of the insulating material include hard plastic (engineering plastics such as nylon and delrin) and ceramics (such as alumina).

BRIEF DESCRIPTION OF THE DRAWINGS

FIGS. 4A and 4B are drawings showing a structure of the wire grip, wherein FIG. 4A is a side cross-sectional drawing, and FIG. 4B is a plane cross-sectional drawing.

FIG. 14A and 14B are drawings showing a structure of the earth terminal, wherein FIG. 14A is a side cross-sectional drawing, and FIG. 14B is a front drawing.

FIGS. 23A-23D are drawings showing a whole shape of the wire grip, wherein FIG. 23A is a front drawing, FIG. 23B is a left side drawing, FIG. 23C is a right side drawing and FIG. 23D is a plane drawing.

FIGS. 25A and 25B are drawings showing a part of the wire grip, wherein FIG. 25A is a side drawing and FIG. 25B is a cross-sectional along line A-B.

FIGS. 26A-26C are drawings showing a structure of the jig, wherein FIG. 26A is a front drawing, FIG. 26B is a bottom plane drawing, and FIG. 26C is a side drawing.

FIGS. 27A and 27B are front cross-sectional drawings showing the handling method of the jig, wherein FIG. 27A is a front-sectional drawing showing a first step of the handling method of the jig, and FIG. 27B is a front sectional drawing showing a second step of the handling method of the jig.

FIGS. 28A and 28B are front cross-sectional drawings showing the handling method of the jig, wherein FIG. 28A is a front-sectional drawing showing a third step of the handling method of the jig, and FIG. 28B is a front sectional drawing showing a fourth step of the handling method of the jig.

FIGS. 30A-30C are drawings showing a state in which the wire grip is attached to the electrical apparatus, wherein FIG. 30A is a plane drawing showing the state, FIG. 30B is a left-side drawing showing the state and FIG. 30C is a front drawing showing the state.

FIGS. 31A-31C are drawings showing a state in which wire grip according to another embodiment is attached, wherein FIG. 31A is a plane drawing showing the state, FIG. 31B is a front drawing showing the state and FIG. 31C is a right side drawing showing the state.

DETAILED DESCRIPTION OF EMBODIMENT OF THE INVENTION

The preferred embodiments of the present invention will be described in detail with reference to the accompanying drawings.

Figure 1:
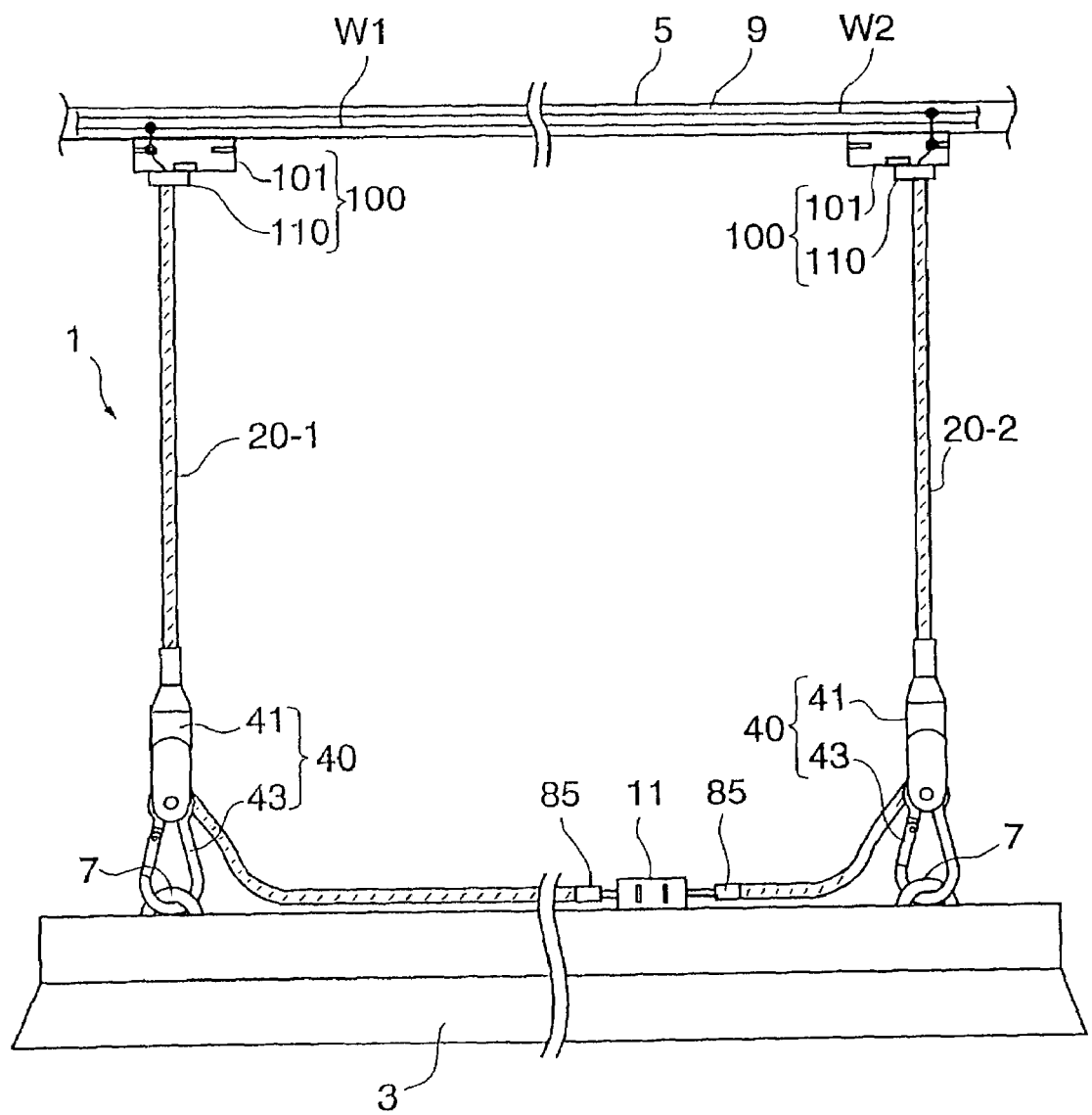
FIG. 1 is a drawing schematically showing an electrical apparatus suspension unit according to the one embodiment of the present invention.

FIG. 1 is a drawing schematically showing an electrical apparatus suspension unit according to the one embodiment of the present invention.

The electrical apparatus suspension unit 1 in this embodiment serves as power supplying to a lighting apparatus (a fluorescent lighting) 3 as well as suspending the lighting apparatus 3 from a ceiling 5. The suspension unit 1 is provided with two power supply wires 20-1 and 20-2, a lower holder 40 for securely connecting the lower end of the power supply wire 20 to a hung member 7 formed on the lighting apparatus 3 and a upper holder 100 for securely connecting the upper end of the power supply wire 20 to a rail 9 laid on the ceiling 5. The lighting apparatus 3 operates at a low voltage of AC600V or less.

The structure of the power supply wire 20 will be explained.

Figure 2:
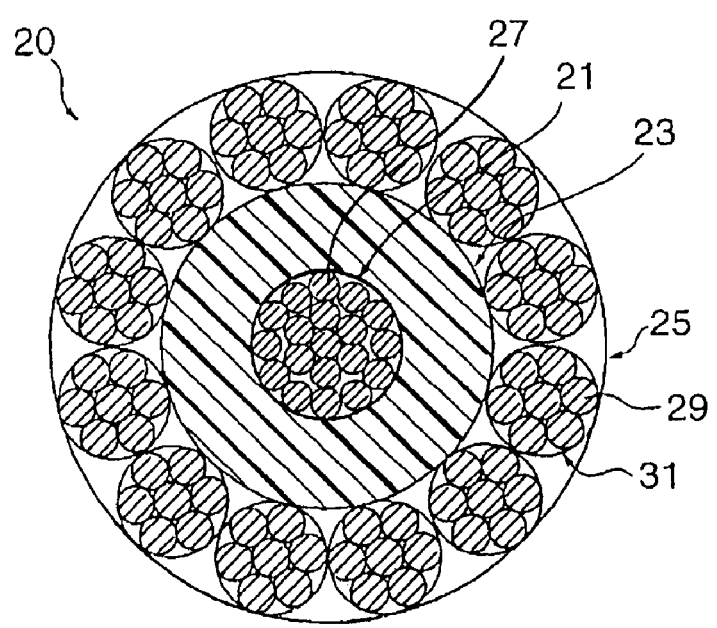
FIG. 2 is a cross-sectional drawing showing the structure of the power supply wire according to the present invention.

FIG. 2 is a cross-sectional drawing showing the structure of the power supply wire according to the present invention.

The power supply wire 20 is composed of a core wire 21, an insulating layer 23 covering the core wire 21 and an outer layer 25 covering the insulating layer 23. The core wire 21 is made such that plural (for example, 19) strands (unit line) 27 made by copper alloy having high strength and high conductivity are stranded. The strand 27 has tensile strength of 500 MPa or higher, preferably 700 MPa or higher, more preferably 900 MPa or higher and conductivity of 40% IACS or higher, preferably 50% ICAS or higher, more preferably 60% IACS or higher.

For such a high strength and high conductive strand made of copper alloy having aforesaid property, for example, a strand made of alloy of copper and silver, produced by Showa Electric Wire & Cable Co., Ltd., may be employed (refer to "Development of Cu—Ag alloy Ultra Fine wire with high strength and high conductivity" National Conference of Institute of Electrical Engineers of Japan, 1997). The strand is made such that an alloy having a structure in which a Cu—Ag eutectic phase exists around a copper group in a network state is subjected to a wire drawing in which a set of intermediate heat treatment and cold work treatment are repeated several times. In the maximum conductivity, it is possible to have the maximum tensile strength of 1000 MPa and the maximum conductivity of 80% IACS. For reference, a soft copper wire for electricity has tensile strength of 250 MPa and conductivity of 98% IACS. The strand has a diameter of 0.2 mm, for example.

The core wire 21 made by stranding nineteen of the strand 27 as described above has breaking strength of 54.8 Kg and is allowed to pass current of 0.6 SQ at a rated current of 6 A (100V 600 W). For example, the core wire 21 has a diameter of 0.95 mm.

The insulating layer 23 covers outer circumference of the core wire 21 with a uniform thickness. The insulating layer 23 is made of nylon and has a thickness of 0.68 mm, in this example.

The outer layer 25 is made such that plural (for example, 12) stranded wires 31 are braided around the insulating layer 23. The stranded wire 31 is made such that plural (for example 7) strands 29 made of stainless steel are stranded. For example, the strand 29 made of stainless steel has a diameter of 0.22 mm. Thus, the power supply wire 20 having the outer layer 25 has a diameter of 3.6 mm. The outer layer 25 made of stainless steel improves tensile strength, and therefore the power supply wire 20 allows breaking strength of 640 kg.

In the power supply wire 20, a current flows through the core wire 21. The suspension unit 1 employs the two power supply wires 20-1 and 20-2, as shown in FIG. 1, in a manner such that the core wire 21 of the power supply wire 20-1 operates as a grounded conductor cable and the core wire 21 of another power supply wire 20-2 operates as a voltage-applied conductor cable. When current flows through the conductor cables, an induction current flows in the conduits of the conductor cables. The induction currents, however, are canceled by the nonmagnetic and conductive outer layer 25, whereby heat generation of the insulating layer 23 being coated the wire core does not occur. Accordingly, the outer layer 25 works to enhance tensile strength of the wire as well as to cancel the induction current.

Next, the lower holder 40 for securely connecting the lower end of the power supply wire 20 to the hung member formed on the lighting apparatus 7 will be explained.

Figure 3:
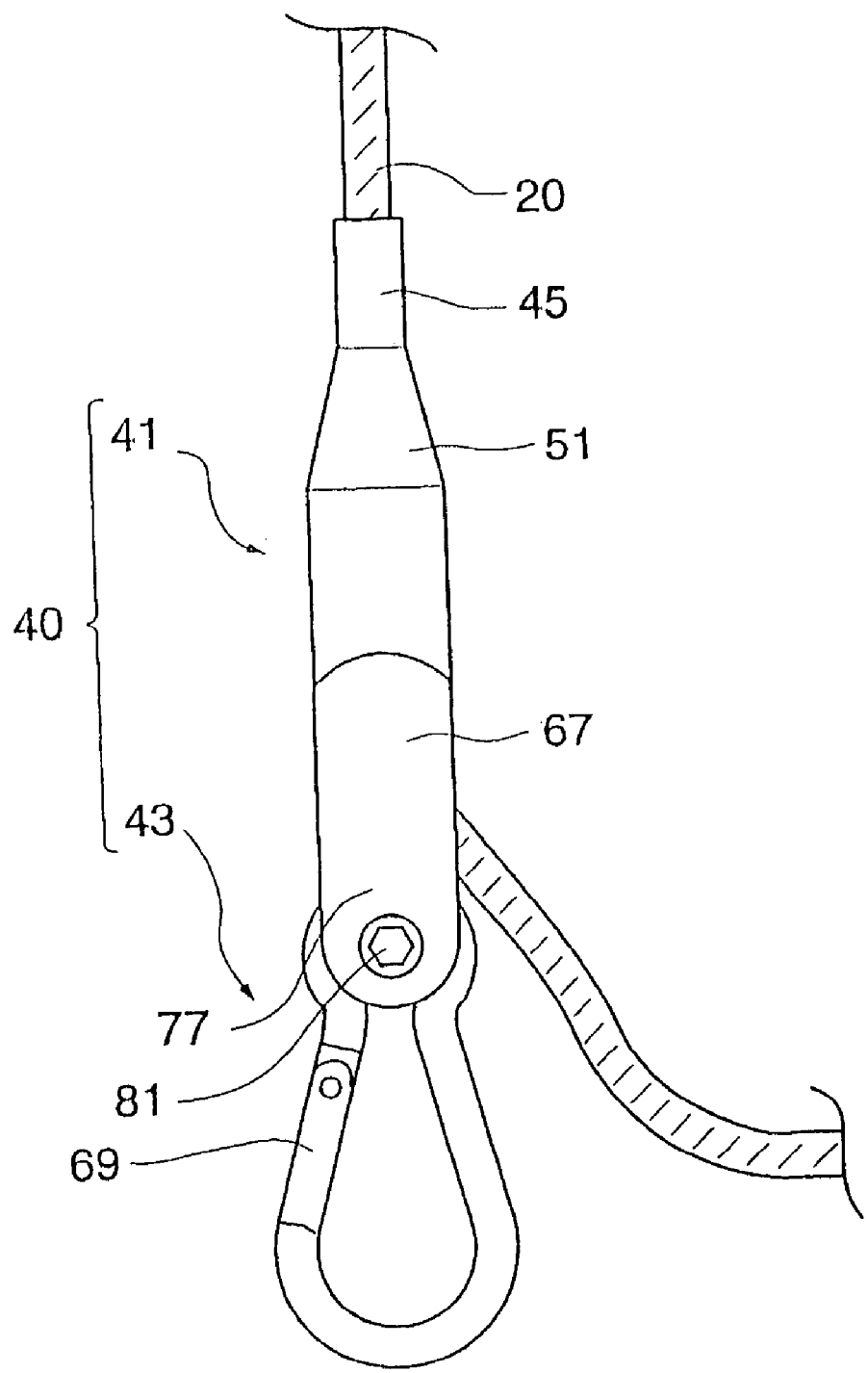
FIG. 3 is a drawing showing a structure of the lower holder.

FIG. 3 is a drawing showing a structure of the lower holder.

The lower holder (a wire grip with a hook) 40 is provided with a wire grip 41 capable of securely connecting the power supply wire 20 at a desirable position and a hook 43 which is engaged with the hung member 7 formed on the lighting apparatus 3. The hook 43 is connected to the bottom of the wire grip 41 at the upper portion thereof.

The structure of the wire grip 41 will be explained.

Figure 4A:
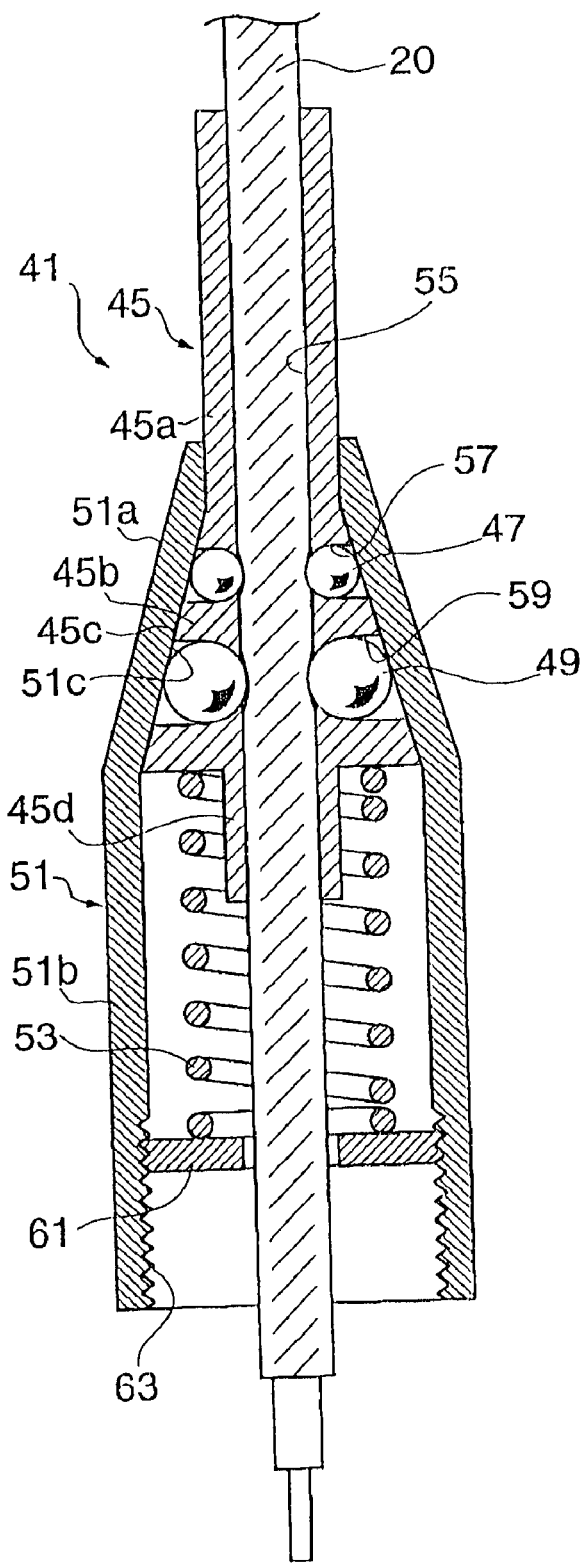
Figure 4B:
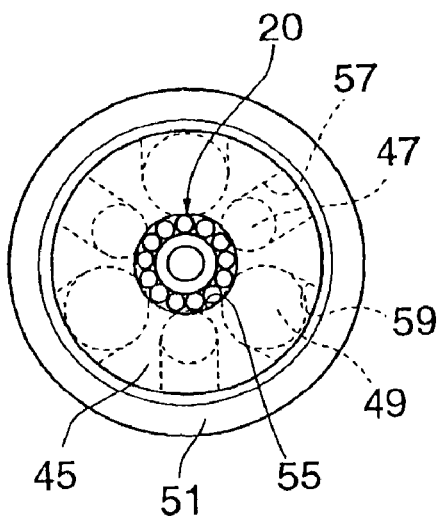

FIG. 4 is a drawing showing a structure of the wire grip, FIG. 4(A) is a side cross-sectional drawing, and FIG. 4(B) is a plane cross-sectional drawing.

Figure 5:
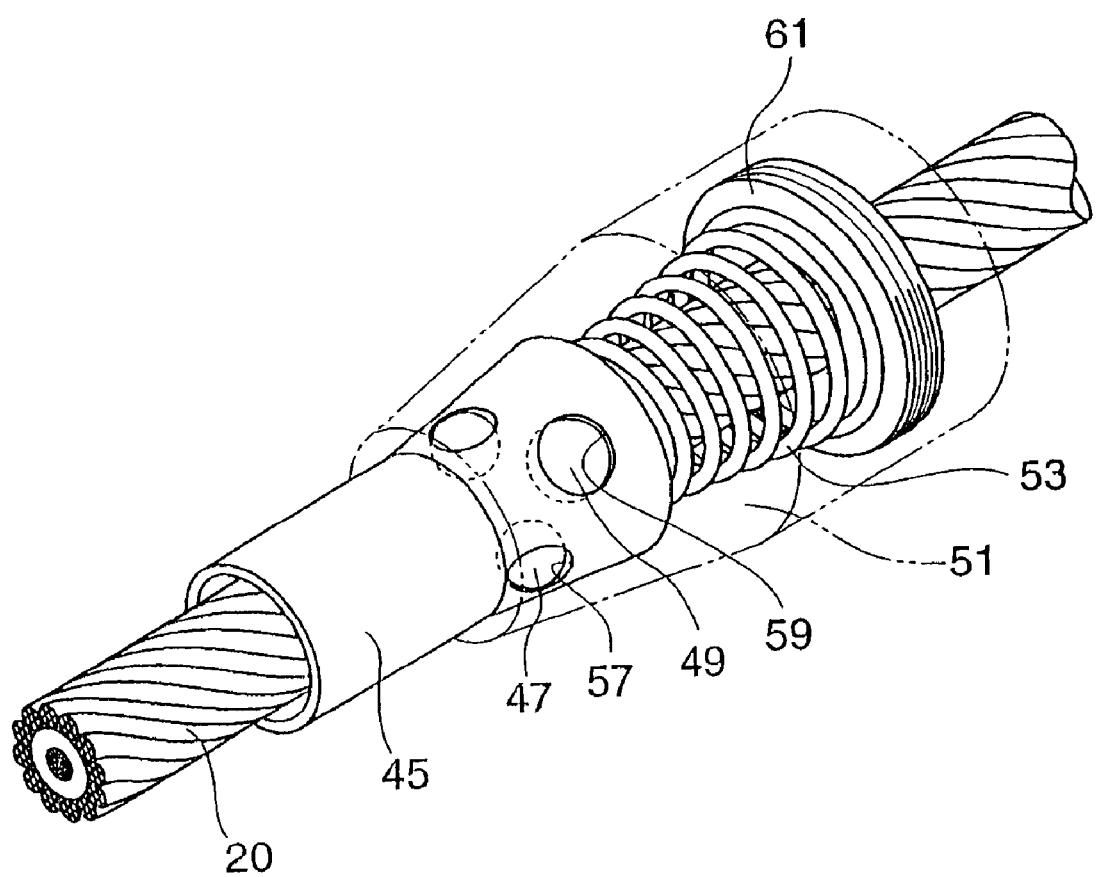
FIG. 5 is a partial perspective drawing showing a structure of the wire grip.

FIG. 5 is a partial perspective drawing showing a structure of the wire grip.

The wire grip 41, as shown in FIG. 1, securely connects the lighting apparatus 3, which is suspended by the hook 43 of the wire grip 41, to the power supply wire 20 at a desirable position (in other words, it is capable of adjusting a height of the lighting apparatus 3). Accordingly, the wire grip 41 requires sufficient strength to support a load of the lighting apparatus 3 while maintaining insulation of the core wire 21 of the power supply wire 20. The wire grip 41 is composed of an inner sleeve 45, plural balls 47 and 49, an outer sleeve 51 and a spring 53.

The inner sleeve 45 has a wire-insertion bore 55 for inserting the power supply wire 20 therethrough. The wire-insertion bore 55 has a uniform inner diameter in the length direction (the longitudinal direction in FIG. 4), which added α (for example, 1 mm) to a diameter of the power supply wire 20. The inner sleeve 45 includes a cylindrical upper portion 45a and a conical lower portion 45b with a tapered outer surface 45c of which an outer diameter is widened toward the bottom of the inner sleeve 45.

The conical lower portion 45b has two pairs of three ball-set bores 57 and 59 opened at both of the tapered outer surface 45c and the wire-insertion bore 55. And, as shown in FIG. 4(A), each of the two pairs of the ball-set bores 57 and 59 extending in a perpendicular direction of the wire-insertion bore 55 (in a diametric direction) are arranged in two stages in the axis direction of the wire-insertion bore 55. The upper ball-set bores 57 have a diameter smaller than that of the lower ball-set bores 59. And, as shown in FIG. 4(B), the upper and lower ball-set bores 57 and 59 are alternately arranged around an axis of the wire-insertion bore 55. That is, the three upper ball-set bores 57 are arranged spaced by 120° around the axis, and the three lower ball-set bores 59 are arranged spaced by 120° around the axis while being sifted relative to the upper ball-set bores 57 by 60°. Accordingly, as shown in FIG. 4(B), all of the ball-set bores are arranged spaced by 60° around the axis of the wire-insertion bore 55.

In each of the upper ball-set bores 57, a small-diameter ball 47 is received. In each of the lower ball-set bores 59, a large-diameter ball 49 is received. Each of the upper ball-set bore 57 has a diameter added α (for example, 0.1 mm) to the diameter of the ball 47 and a length slightly shorter than the diameter of the ball 47.

Each of the lower ball-set bore 59 has a diameter added α (for example, 0.1 mm) to the diameter of the ball 49 and a length slightly shorter than the diameter of the ball 49. Here, each of the lengths means a length at the central portion of each ball-set bore 57, 59 in the width direction of the bores. In this example, the upper ball-set bores 57 have a diameter (a diameter of the small-diameter ball 47) of 2.4 mm, and the lower ball-set bores 57 have a diameter (a diameter of the large-diameter ball 49) of 2.8 mm.

Accordingly, as shown in FIG. 4, when the balls 47 and 49 are received respectively in the ball-set bores 57 and 59, each of the bolls 47 and 49 are protruded partially into the wire-insertion bore 55 at the inside surface thereof.

The conical lower portion 45b has a lower cylindrical portion 45d to which the spring 53 is fitted at the upper portion thereof.

The outer sleeve 51 has a frustum-shaped upper portion 51a with a tapered inner surface 51c which is contacted with the tapered outer surface 45c of the inner sleeve 45, and a cylindrical lower portion 51b. The lower portion 51b is formed with a ring-shaped spring retainer 61 at the bottom of the inside thereof. The spring 53 is arranged in the outer sleeve 51 between the bottom surface of the conical lower portion 45b of the inner sleeve 45 and the spring retainer 61 of the outer sleeve 51. The spring 53 is fitted onto the lower cylindrical portion 45d of the inner sleeve 45 at the upper portion thereof. The spring 53 biases the inner sleeve 45 upwardly with respect to the outer sleeve 51 so that the tapered outer surface 45c of the inner sleeve 45 will contact with the tapered inner surface 51c of the outer sleeve 51.

The manner of grip operation of the wire grip 41 will be explained.

When the spring 53 biases the inner sleeve 45 upwardly with respect to the outer sleeve 51 so that the tapered outer surface 45c of the inner sleeve 45 is contacted to the tapered outer surface 51c of the outer sleeve 51, each of the balls 47 and 49 received in the ball-set bores 57 and 59 is pressed by the tapered inner surface 51c of the outer sleeve 51 at the outside surface thereof and protrudes into the wire-insertion bore 55 at the inside surface thereof. As a result, the wire 20 inserted through the wire-insertion bore 55 is pressed by the protruded balls 47 and 49 so as to be securely connected to the wire grip 40.

Assuming each of the balls presses the wire 20 with equal force, the six balls will allow the total force for holding the wire applied by all of the balls to increase, while the force applied by each ball to decrease. This decreases the depth in which the balls are dug into the outer layer of the wire. As a result, since the depth of the balls dug into the insulating layer decreases, the insulation of the insulating layer is well maintained, whereby the core wire can be protected.

In addition, the ball-set bores are arranged at the upper and lower stages in the axis direction of the wire-insertion bore, and the upper and lower ball-set bores are alternately arranged around an axis of the wire-insertion bore. This enables to have smaller space for arrangement of plural ball-set bores. And, since the force is applied to the wire by using plural balls from the equally separated positions around the wire, a load is not concentrated on one portion of the wire.

Next, the manner of releasing operation of the wire grip will be explained.

Figure 6:
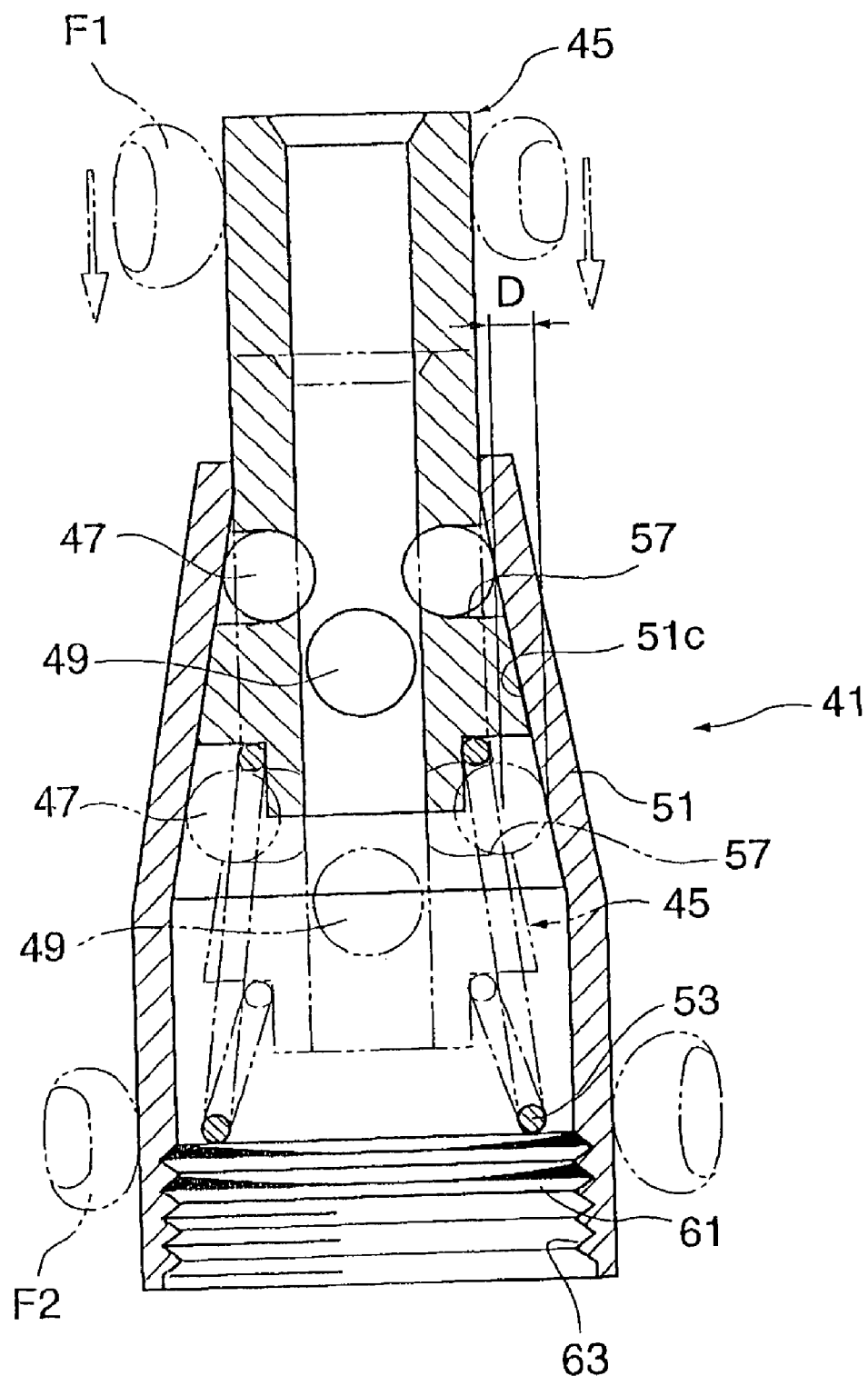
FIG. 6 is a drawing showing the releasing operation of the wire grip.

FIG. 6 is a drawing showing the releasing operation of the wire grip.

In order to release the wire grip 41 from the wire, first, a user pinches the inner sleeve 45 by fingers F1 of one-hand while pinching the outer sleeve 51 by fingers F2 of another hand. Then, pressing the inner sleeve 45 toward the outer sleeve 51 (in a direction shown by arrows in the figure) against the biasing force of the spring 53 causes the inner sleeve 45 to be moved in the direction in which the inner diameter of the tapered inner surface 51c of the outer sleeve 51 is larger (downwardly in FIG. 6), as represented by a double-dashed line in the figure. As a result, a clearance D is produced between the outside surfaces of the ball-set bores 57 and 59 and the tapered inner surface 51c of the outer sleeve 51. Since the balls 47 and 49 are pressed inwardly by the tapered inner surface 51c of the outer sleeve 51, the clearance D permits the balls to move outwardly toward the clearance.

This causes the balls 47 and 49 to depart from the wire 20 resulting in that the force by which the wire 20 is gripped disappears or becomes weak. Then, the wire 20 can freely slide upwardly and downwardly through the wire-insertion bores 55. And, since the balls 47 and 49 are rotatably received in the ball-set bores 57 and 59, friction between the balls 47 and 49 and the wire 20 is so small that the wire 20 can slide smoothly.

The sliding action is permitted as long as the inner sleeve 45 being pressed with respect to the outer sleeve 51. After sliding the wire 20 for a desired length, the force by which the inner sleeve 45 is pressed is released. This causes the inner sleeve 45 to be biased by the spring 53, whereby the tapered outer surface 45c of the inner sleeve 45 is contacted with the tapered inner surface 51c of the outer sleeve 51. As a result, the balls 47 and 49 are pressed by the tapered inner surface 51c so as to hold the wire 20.

And, when an electrical apparatus is held by the wire grip 41, the outer sleeve 21 is pulled downwardly by its own weight. This causes the tapered inner surface 51c of the outer sleeve 51 to be moved in the direction in which the inner diameter of the tapered outer surface 45c of the inner sleeve 45 becomes wide, as a result, the depth in which the balls 47 and 49 are dug into the wire 20 becomes deep, increasing a wire gripping force.

Figure 7:
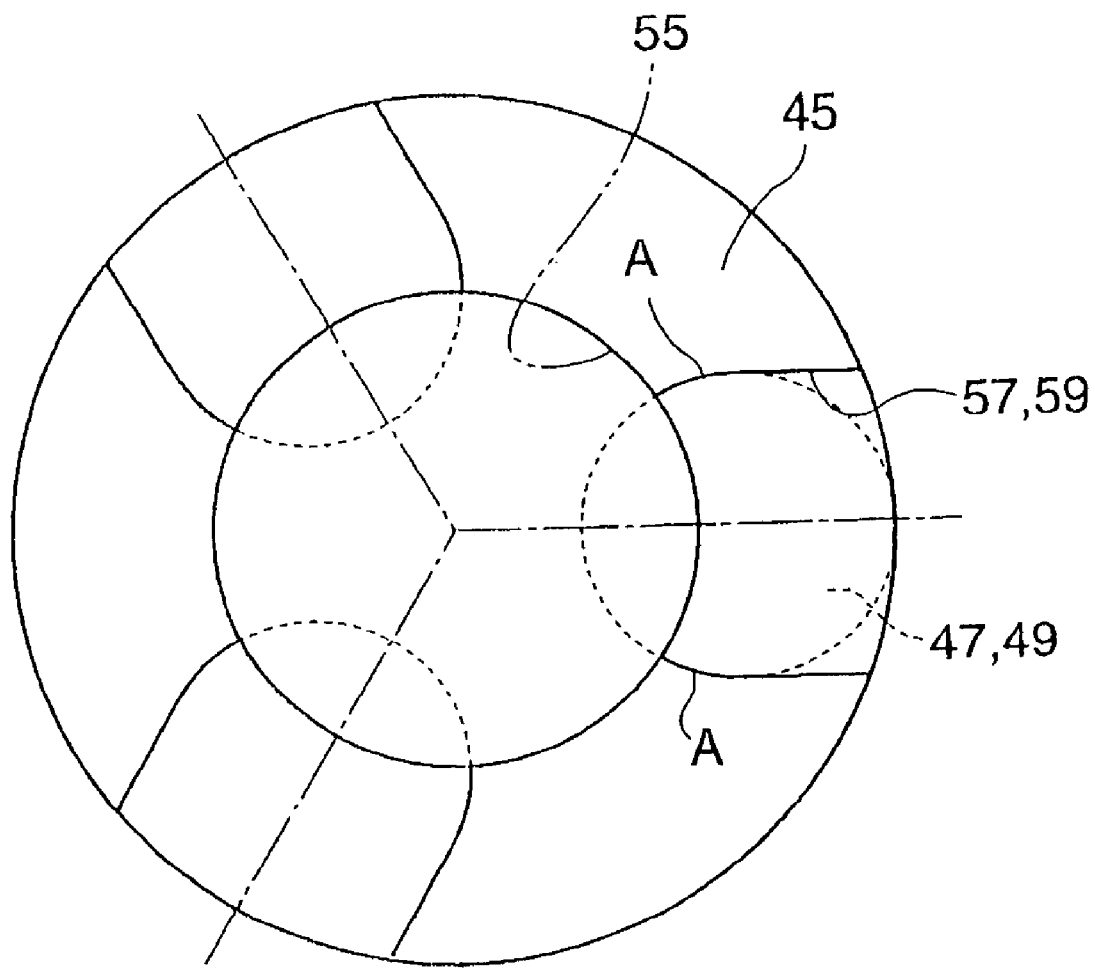
FIG. 7 is a cross-sectional drawing showing a shape of the ball-set bore.

FIG. 7 is a cross-sectional drawing showing a shape of the ball-set bore.

Each of the ball-set bores 57 and 59 is not a straight through bore. As shown in the figure, each of the ball-set bores has a curved inner surface A at the inside end (the side of the wire-insertion bore 55). Each of the curved inner surfaces (a retainer portion) A has the same curvature as each of the bolls 47 and 49 received in each ball-set bore. Such inner surface A is machined by using a drill with a spherical distal end.

The ball-set bores 57 and 59 having the aforesaid shape causes the balls 47 and 49 received therein to be retained by the curved inner surface A, whereby the balls do not protrude into the wire-insertion bore 55 excessively. Accordingly, the curved surface A has a suitable length which allows a gripping force of such degree that excessive load does not apply to the outer layer and the insulating layer. Thus, the thickness of the insulating layer can be kept constant, ensuring dielectric strength.

As shown in FIG. 4 and FIG. 6, the outer sleeve 51 is formed at the inner bottom thereof with a female thread 63 which is engaged with the upper portion of the hook 43. And, the spring retainer 61 is engaged deeply with the recess of the female thread 63.

The structure of the hook 43 will be explained.

Figure 8:
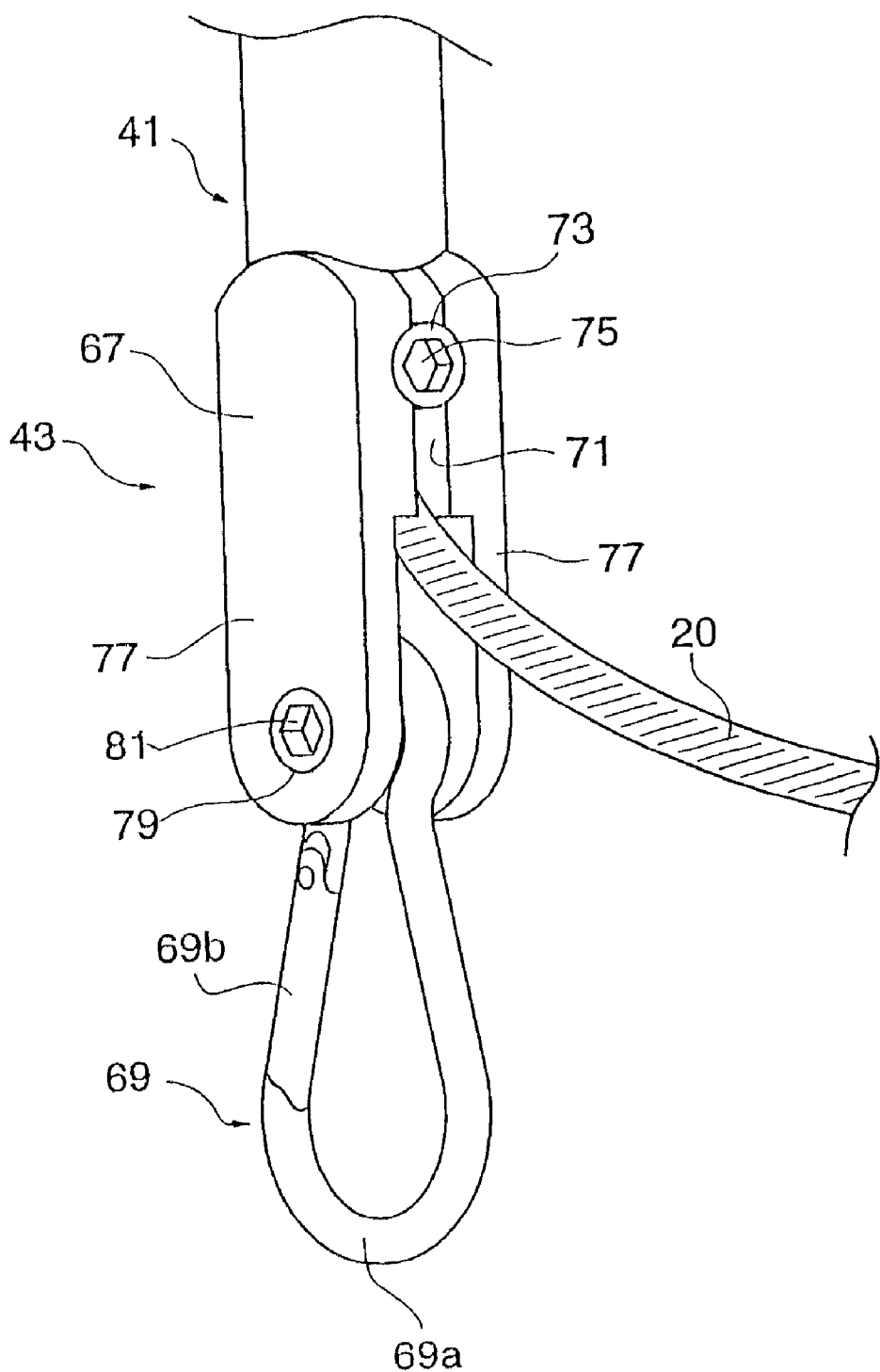
FIG. 8 is a perspective drawing showing the hook.

FIG. 8 is a perspective drawing showing the hook.

The hook 43 is composed of a wire holder 67 and suspension member 69. The wire holder 67 is formed at the upper portion thereof with a male thread to be engaged with the female thread 63 of the outer sleeve 51 of the wire grip 41, whereby the hook 43 is fixed to the wire grip 41.

The wire holder 67 has a substantially cuboid-shape, and is formed with a slit 71 from the center of the upper end surface to approximately the center of the side surface (the right side surface in FIG. 6). The slit 71 has the back surface which is sloped from the center of the upper end surface to the center of the side surface of the holder 67. And, the holder 67 has a thread bore 73 to be engaged with a screw 75, at the upper portion of the slit 71. At the lower portion of the wire holder 67, two legs 77 are formed extending both sides of the slit 71. The legs 77 has thread bores 79 at the distal ends, into which a screw 81 is engaged. And, the suspension member 69 is mounted to the bridged screw 81 between the legs 77.

The suspension member 69 has a loop-shape comprising a circular upper portion and a tear-drop shaped lower portion. The upper portion is hooked on the bridged screw 81 between the legs 77 of the wire holder 67. The lower portion is detachably attached to the hung member 7 (as shown in FIG. 1) formed on the lighting apparatus 3.

The suspension member 69 is composed of a C-shaped part 69*a* and a snap part 69*b*, and both are combined to form the loop-shape. The snap part 69*b* is pivotably connected to the upper end of the C-shaped part 69*a*, and is biased by a leaf spring (nor shown) so as to close the loop. When the snap part 69*a* is pivoted inwardly, the snap part 69*a* is separated from the C-shaped part 69*b*, resulting in opening a gap between the snap part 69*a* and the C-shaped part 69*b*, through which the hung member 7 of the lighting apparatus 4 is passed. The snap part 69*b* and the C-shaped part 69*a* are engaged such that the snap part 69*b* does not open outwardly and does not depart from the C-shaped part 69*a*.

The wire 20 passing through the wire-insertion bore 55 and a spring retainer 61 of the wire grip 41 is inserted into the slit 71 from the upper end surface of the wire holder 67 and guided along the sloped back surface and then led out from the slit 71 at the side surface thereof. Accordingly, the wire 20 is straightly inserted in the wire grip 41 and laterally led out from the wire holder 67. Accordingly, it becomes possible that the wire 20 straightly hung from the ceiling is laterally turned through the lower holder 40 so as to be connected to a terminal 11 (as shown in FIG. 1) of the lighting apparatus 3.

After releasing the gripping force of the wire grip 41, a desirable length of the wire 20 is led out from the lower holder 40, and then the wire 20 is griped by the wire grip 41. Then, a screw 75 is engaged with the thread bores 73 of the wire holder 67 while catching the wire 20 between the distal end of the screw 75 and the back surface of the slit 71, and as the result, the wire 20 is securely held to the hook 43.

As described above, the lighting apparatus 3 is securely held to the wire 20 by the lower holder (a grip with a hook) 40.

The wire 20 led out from the lower holder 40 is connected to an AC socket of the terminal 11 mounted on the lighting apparatus 3, as shown in FIG. 1. At this time, the wire 20 of which the outer layer is stripped is inserted to the socket, and the core wire 21 exposed by stripping the insulating layer is connected to a terminal contact. In order to prevent the outer layer 25 from loosing into the metal thin lines 29, the distal end of the wire 20 is terminated with a terminal cap 85 (as shown in FIG. 1).

Figure 9:
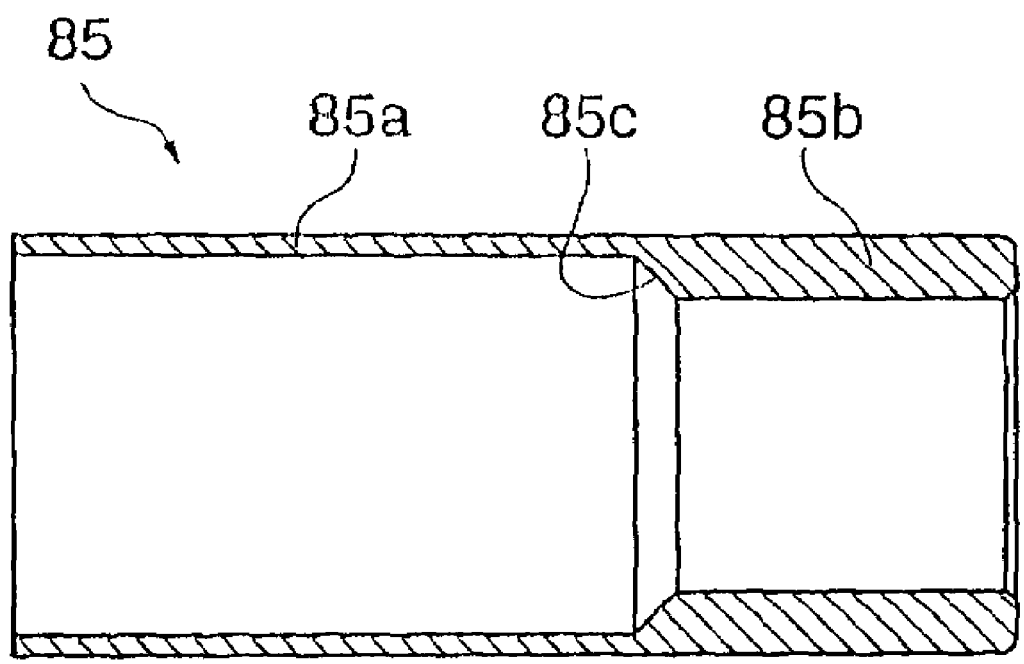
FIG. 9 is a cross-sectional drawing showing the terminal cap.

FIG. 9 is a cross-sectional drawing showing the terminal cap.

The terminal cap 85 is a cylindrical member made of nickel plated brass, and has a large-diameter portion 85*a* and a small-diameter portion 85*b*. The large-diameter portion 85*a* has a diameter almost equal to the diameter of the wire 20, and the small-diameter portion 85*b* has a diameter almost equal to the diameter of the wire 20 of which the outer layer is stripped. Between the both portions, a tapered step 85*c* is formed.

The wire 20 of which the outer layer is stripped is inserted into the large-diameter portion 85 of the terminal cap 85 until the stripped outer layer is enclosed by the large-diameter portion 85 and the end of the stripped outer layer is abutted on the tapered step 85*c* with the insulating layer being enclosed by the small-diameter portion 85*b*. Then, the cap 85 is fixed to the wire 20 by adhesion. Thus, the stripped outer layer is enclosed by the large-diameter portion 85*a*, thereby treating the distal end of the wire without loosing into the metal thin lines.

Next, the upper holder 100 for securely connecting the upper end of the wire 20 to the rail 9 serving also as a wiring duct will be explained.

The upper holder 100, as shown in FIG. 1, is composed of a slide plug 101 attachable to the rail 9 and an electrode support 110 to which the upper end of the power supply wire 20 is connected. The rail 9 is a structure laid on the ceiling 5. The slide plug 101 is slidably mounted to the rail 9. The electrode support 110 is mounted on the under surface of the slide plug 101.

Figure 10A:
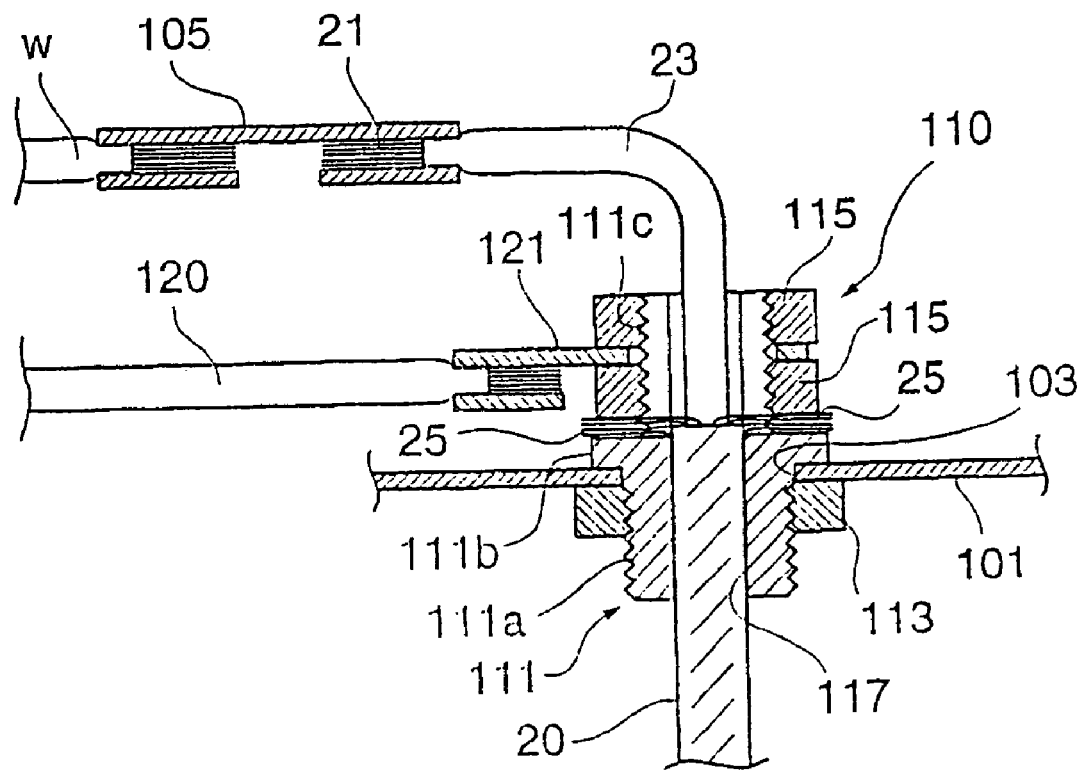
FIG. 10A is a drawing showing the electrode support and FIG. 10B is a sectional drawing showing a body of the electrode support.
Figure 10B:
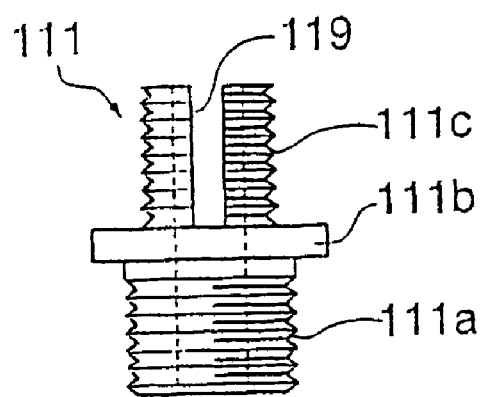

FIG. 10(A) is a drawing showing the electrode support and FIG. 10(B) is a sectional drawing showing a body of the electrode support.

The electrode support 110, which is made of nickel plated brass, connects the core wire 21 of the wire 20 to a conductor cable W inside the rail 9 and also grounds the outer layer 25 of the wire 20. The electrode support 110 is provided with a body 111, a large nut 113 and two small nuts 115. The body 111 has a wire-insertion bore 117 in the length direction. The body 111, as shown in FIG. 10(B), has a large-thread portion 111*a*, a small-thread portion 111*c* and a flange portion 111*b* projected outwardly from between the large and small-thread portions 111*a* and 111*c*. As shown in FIG. 10(B), the small-thread portion 111*c* has two slits 119 extending in the length direction (a longitudinal direction in FIG. 10(B)) at the diametrical positions for each other.

The large nut 113 is engaged with the large-thread portion 111*a* and each of the small nuts 115 is engaged with the small-thread portion 111*c*.

When the electrode support 110 is mounted to the slide plug 101, first, the large-thread portion 111*a* thereof is inserted into a mounting opening 103 formed on the plug 101 from the upper side of the plug 101 until the flange portion 111*b* is locked on the plug 101. Next, the large nut 113 is threadably engaged and tightened with the large-thread portion 111*a* from the lower side of the plug 101. This causes the plug 101 to be caught between the large nut 113 and the flange 111*b*, as the result, the body 111 of the electrode support 110 is securely mounted to the plug 101.

The upper end of the wire 20 is inserted into the large-thread portion 111*a* of the wire-insertion bore 117 of the electrode support 110 and led out from the small-thread portion 111*c* thereof. Then, the outer layer of the led wire 20 is stripped and then divided into two bundles of thin lines.

Each of the bundles is bended and caught in the slit 119 of the small-thread portion 111c, and then pressed toward the lower end of the slit 119 by using a driver. Then, the first small nut 115 is engaged and tightened with the small-thread portion 111c so as to catch and fix the bundles between the first small nut 115 and the flange portion 111b. This permits the outer layer 25 to conduct to the electrode support 110. In addition, the bundles of the outer layer 25 is cut off so as not to short with the plug 101.

In order to ground the outer layer 25, a pressure terminal 121 attached to the end of an earth cable 120 is inserted onto the small-thread portion 111c and then the second small nut 115 is engaged and tightened therewith so as to catch the pressure terminal 121 between the two small nuts 115. This permits the outer layer 25 to be grounded to the earth cable 120 via the electrode support 110.

The wire 20 in which the insulating layer 23 is exposed by stripping the outer layer 25 is led to a terminal 105 inside the plug 101. Then, the exposed core wire 21 by stripping the insulating layer 23 conducts to the terminal 105. As shown in FIG. 1, the core wire of one power supply wire 20-1 conducts to a grounded conductor cable W1 of a power line laid inside the rail 9 via the plug 101, and the core wire of another power supply wire 20-2 conducts to a voltage applied conductor cable W2 of the power line via the plug 101.

The manner of installation of the suspension unit will be explained with reference to FIG. 1.

First, the upper ends of the power supply wires 20 are connected to the plug 101 by using the electrode support 110. Then, the plug 101 is slid along the rail 9 to a desirable position. Next, the lower holder 40 is securely held to the wire by the wire grip 41 so as to suspend the lighting apparatus 3 at a predetermined height. At the same time, the wire holder 43 is hooked to the hung member 7 formed on the lighting apparatus 3. If the length of the wire 20 between the upper holder 40 and the terminal 11 is too long, the wire 20 therebetween is bundled on the lighting apparatus 3.

As described above, the electrical apparatus suspension unit 1 serves as power supplying the lighting apparatus 3 as well as suspending it from the rail 9 or a wiring duct laid on the ceiling 5. The current flows through the core wire 21 of each power supply wire 20. Since the core wire 21 has a current power of 0.6 SQ, sufficient electrical power enough for operating the lighting apparatus 3 can be supplied. Since the induction current generated on conducting the core wire 21 is canceled by the outer layer 25, heat generation is prevented, whereby it can be used in safety. In addition, since the wire 20 has breaking strength of 640 kg and the wires 20 are securely and safely connected to the lighting apparatus 3, it is possible to support the load of the lighting apparatus 3. According to the loading test (a withstand voltage test) using the power supply wire 20 and the lower holder 40, withstand voltage of 70 kg/3000V is obtained. In addition, it is possible to adjust the height of the lighting apparatus by using the wire grip 41.

Figure 11:
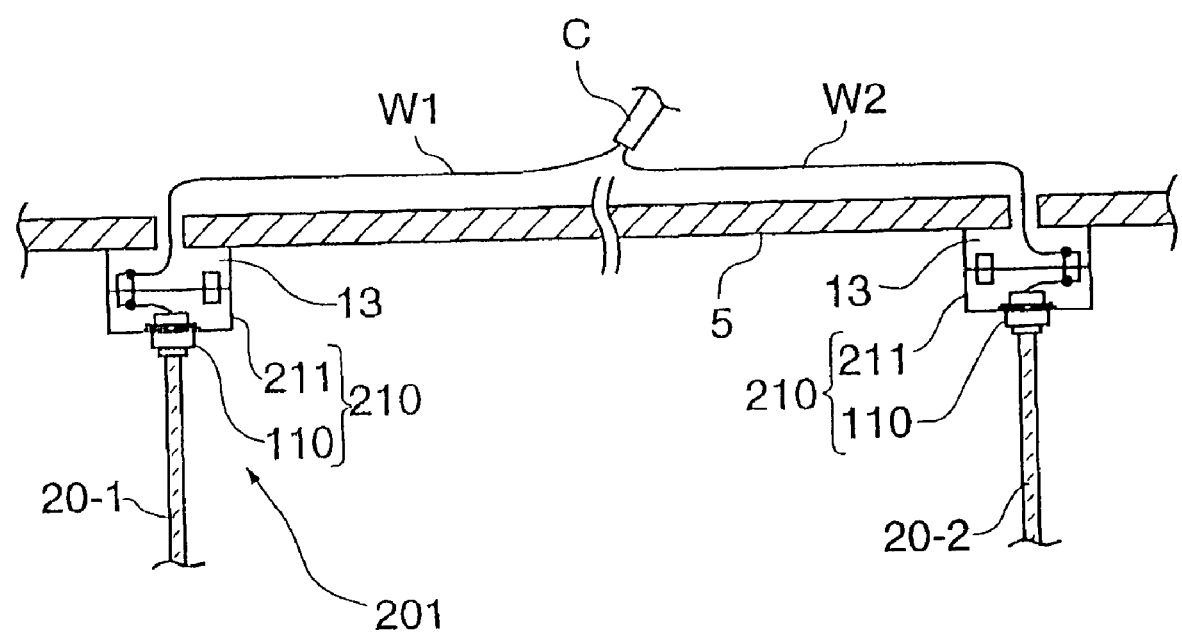
FIG. 11 is a drawing showing an electrical apparatus suspension unit according the second embodiment of the present invention.

FIG. 11 is a drawing showing an electrical apparatus suspension unit according the second embodiment of the present invention.

The electrical apparatus suspension unit 201 of the embodiment also suspends a lighting apparatus from the ceiling 5 by using the two power supply wires 20-1 and 20-2. In the embodiment, a grounded conductor cable W1 and a voltage-applied conductor cable W2 are led out from an F-cable C and are connected to each of wiring terminals 13 mounted on the ceiling 5. The electrical apparatus suspension unit 201 has substantially the same structure as the device 1 as shown in FIG. 1 except that an upper holder 210 has a structure for the structure of the wiring terminal 13.

The upper holder 210 is composed of a plug 211 for the wiring terminal 13 and the electrode support 110 (as shown in FIG. 10) having the same structure as that of the device 1 shown in FIG. 1. The electrode support 110 is mounted to the plug 211. The plug 211 is mounted to the wiring terminal 13. The core wire of one power supply wire 20-1 conducts to the grounded conductor cable W1 at one wiring terminal 13 via the upper holder 210 and the core wire of another power supply wire 20-2 conducts to the voltage-applied conductor cable W2 at another wiring terminal 13 via the upper holder 210.

Figure 12:
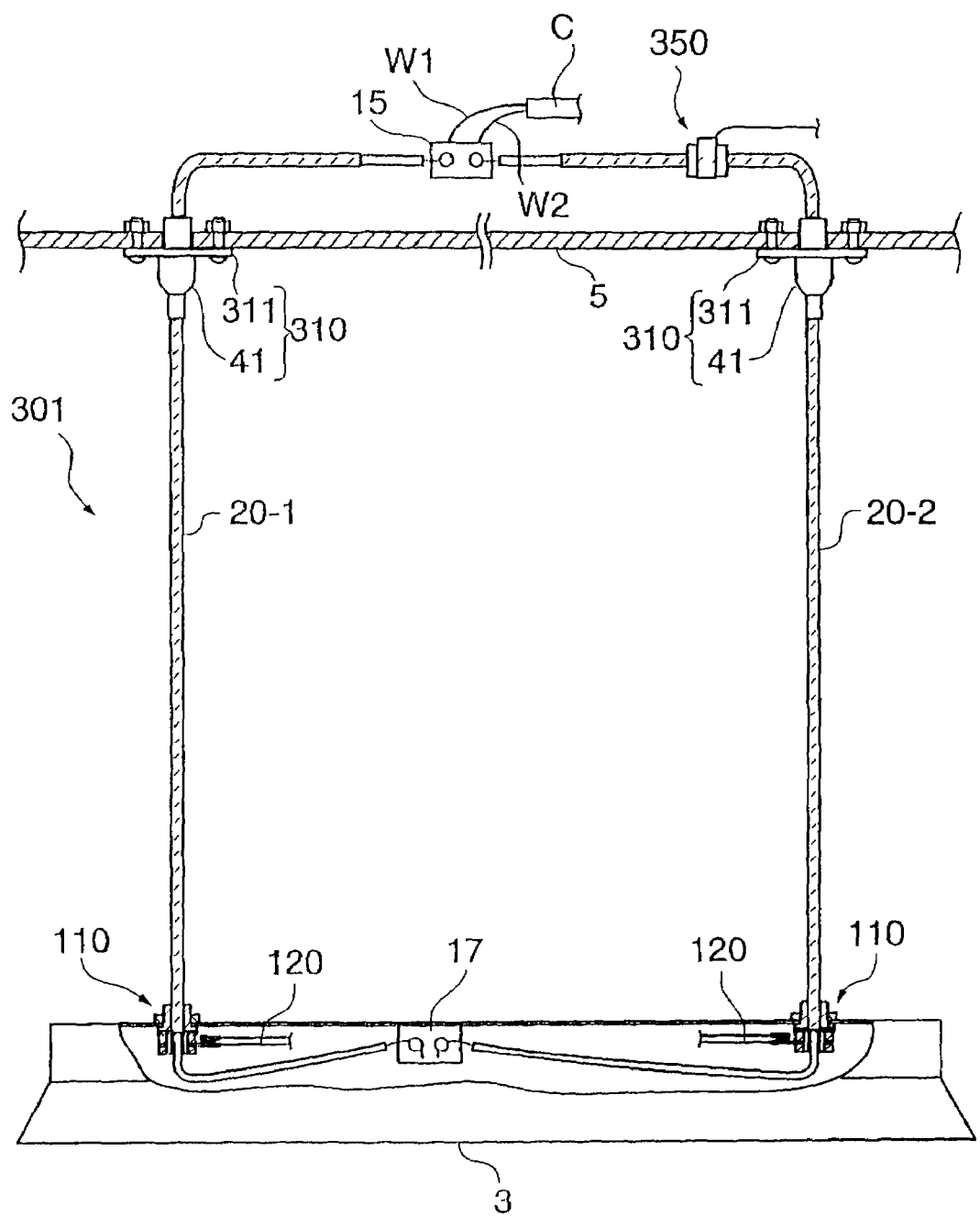
FIG. 12 is a drawing showing an electrical apparatus suspension unit according to the third embodiment of the present invention.

FIG. 12 is a drawing showing an electrical apparatus suspension unit according to the third embodiment of the present invention.

The electrical apparatus suspension unit 301 of the embodiment suspends the lighting apparatus 3 from the ceiling 5 by using the two power supply wires 20-1 and 20-2. In this embodiment, the rail 5 is not laid on the ceiling 5, and the lighting apparatus 3 has a terminal (a pressure joint terminal) 17 inside thereof.

Since a rail or a wiring terminal is not laid on the ceiling 5, it is necessary to connect the upper ends of the wires 20 to a wiring terminal 15 above the ceiling. A grounded conductor cable W1 and a voltage-applied conductor cable W2 led from a F-cable C are connected to the wiring terminal 15 above the ceiling. The wires 20 are maintained to the ceiling 5 by the upper holder 310 at the upper portions thereof.

Figure 13:
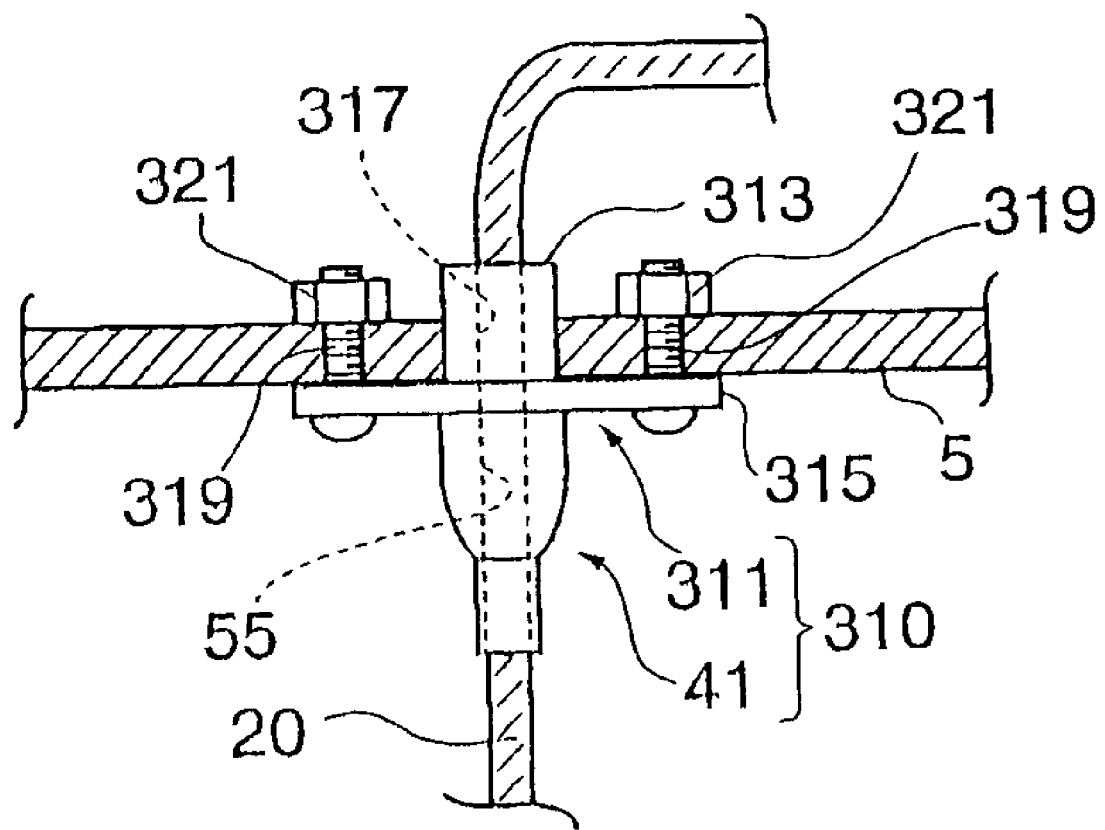
FIG. 13 is a drawing showing a structure of the upper holder.

FIG. 13 is a drawing showing a structure of the upper holder.

The upper holder (a wire grip with a holding part) 310 is composed of a wire grip 41 capable of being connected to the power supply wire at a desirable position and a mounting part 311 for mounting the wire grip 41 to the ceiling (a structure). The wire grip 41 has the same structure as that of the wire grip 41 of the device 1 shown in FIG. 1, and is composed of an inner sleeve, balls, an outer sleeve and a spring, so, the description of each part of the wire grip 41 is omitted. In this example, the wire grip 41 is used upside down.

The mounting part 311 has a sleeve portion 313 and a flange portion 315 projected outwardly from the lower end of the sleeve portion 313. And, the mounting part 311 has a wire-insertion bore 317 on the axis of the wire-insertion bore 55 of the wire grip 41 with the same diameter as the diameter of the wire-insertion bore 55. The sleeve portion 313 is formed at the lower end thereof with a male thread, which is engaged with the female thread 63 (as shown in FIG. 4(A)) of the outer sleeve 51 of the wire grip 41 so as to couple the mounting part 311 to the wire grip 41.

When the upper holder 310 is mounted to the ceiling, first, the sleeve portion 313 thereof is inserted in a mounting opening of the ceiling 5 until the sleeve portion 313 thereof is protruded over the ceiling and the flange portion 313 is abutted on the ceiling 5. Next, the flange portion 315 is fixed to the ceiling 5 by screws 319 and nuts 321. Then, the wire 20 is inserted upwardly through the wire-insertion bores 55 and 317.

As shown in FIG. 12, the wire 20 led out from the upper holder 310 is connected to the wiring terminal 15 above the ceiling. At this time, the wire core of one power supply wire 20-1 conducts to the grounded conductor cable W1 and the core wire of another power supply wire 20-2 conducts to the voltage-applied conductor cable W2.

In addition, as shown in FIG. 12, above the ceiling, an earth attachment 350 is mounted to the power supply wire 20-2 conducted to the voltage-applied conductor cable W2 so as to ground the outer layer of the power supply wire 20-2.

FIG. 14 is a drawing showing a structure of the earth terminal, FIG. 14(A) is a side cross-sectional drawing, and FIG. 14(B) is a front drawing.

The earth attachment 350 made of nickel plated brass is composed of a body 351, a nut 353 for holding an earth terminal, and a nut 355 for fastening the wire 20 thereto. The body 351 has a wire-insertion bore 357 in the length direction. And, the body 351 is formed with a flange 359 projecting outwardly at the one end side (the left side in the figure). The flange 359 is positioned between an earth terminal mounting portion 351a (the left side of FIG. 14(A)) and a wire fastening portion 351b (the right side of FIG. 14(A)).

The earth terminal mounting portion 351a is formed with a thread at the outer surface for engagement with the nut 353. A pressure terminal 381 attached to the distal end of the earth cable 380 is fitted onto the earth terminal mounting portion 351a and then the nut 353 is engaged and tightened with the earth terminal mounting portion 351a so that the pressure terminal 381 can be positioned between the nut 353 and the flange 359, resulting in that the attachment 350 is grounded via the pressure terminal 381.

The wire fastening portion 351b has a thread outer surface which is about half the length of the body 351 on the flange side and a tapered outer surface 361 which is tapered toward the end of the body. Between the thread and the tapered outer surface 361, four radial slotted grooves 363 are formed. The nut 355 is cylindrical-shaped and has an inner surface with a thread which is about half the length thereof and a tapered surface 365. The thread of the nut 355 is engaged with the thread of the fastening portion 351b.

After inserting the wire 20 through the wire-insertion bore 357 of the body, the nut 355 is engaged and tightened with the thread of fastening portion 351b. As the result, the tapered inner surface 365 of the nut 355 presses the tapered outer surface 361 of the body inwardly, whereby a part from the slotted groove 363 to the end of the body (the right side part of the figure) is pressed inwardly so as to fasten the wire 20 inserted through the wire-insertion bore 357, and therefore the earth attachment 350 is conducted and securely maintained to the wire 20.

As described above, the power supply wire 20 can be grounded in the intermediate portion of the outer surface thereof via the earth attachment 350 and the earth cable 380.

The lower holder will be explained.

As shown in FIG. 12, since the lighting apparatus 3 has the terminal 17 (a pressure joint terminal) placed inside thereof, it is necessary to lead out the lower ends of the wires 20 to the inside of the lighting apparatus 3. Accordingly, by using the electrode support 110 (as shown in FIG. 10) of the electrical apparatus suspension unit as shown in FIG. 1, the lower portion of the wire 20 is securely held to the lighting apparatus 3 while conducting the core wires of the wire 20 to the pressure joint terminal 17. In this embodiment, the electrode support 110 is used upside down.

When the electrode support 110 is mounted to the lighting apparatus 3, first, the large-thread portion 111a thereof is inserted through a mounting opening of the lighting apparatus 3 from the under side of the lighting apparatus 3 (as shown in FIG. 10) until the electrode support 110 is locked to the lighting apparatus 3 at the flange 111b thereof. Then, the large nut 113 is engaged with the large-thread portion 111a from the upper side of the lighting apparatus 3 so as to securely hold a casing of the lighting apparatus 3 between the large nut 113 and the flange 111b.

The outer layer of the wire 20 is grounded to the earth cable 120 by the electrode support 110 inside of the lighting apparatus 3. Then, the wire 20 in which the insulating layer is exposed by stripping the outer layer is led to the pressure joint terminal 17 inside of the lighting apparatus 3, and after stripping the insulating layer, the exposed core wires conduct to the pressure joint terminal 17.

Figure 15:
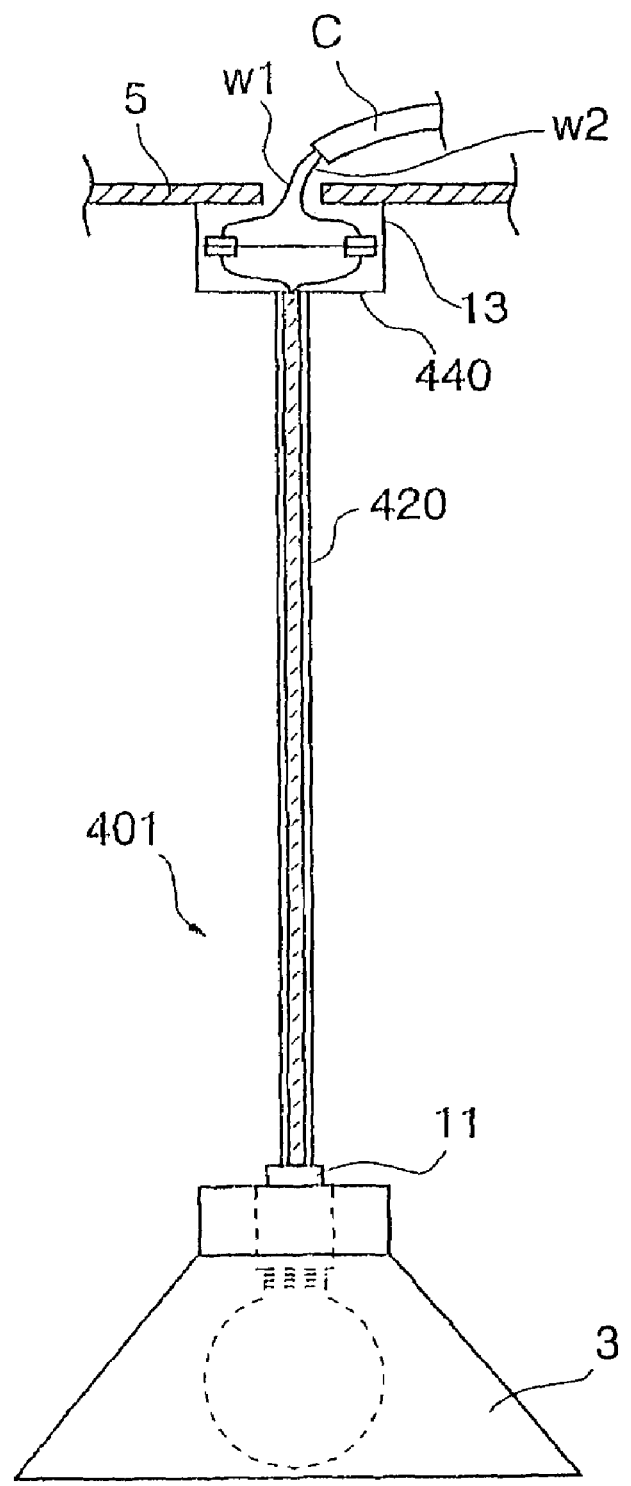
FIG. 15 is a drawing showing a structure of an electrical apparatus suspension unit according to the forth embodiment of the present invention.

FIG. 15 is a drawing showing a structure of an electrical apparatus suspension unit according to the forth embodiment of the present invention.

The electrical apparatus suspension unit 401 serves as suspending the lighting apparatus 3 from the ceiling 5 as well as power supplying thereto. In this embodiment, the lighting apparatus 3 is suspended by one power supply wire 420. The lighting apparatus 3 has an electrical power of AC100V (100V, 200 W).

The electrical apparatus suspension unit 401 is provided with one power supply wire 420 and an upper holder 440 for connecting the upper end of the wire 420 to a wiring terminal 13. The wire 420 has a predetermined length.

The structure of the power supply wire 420 will be explained.

Figure 16:
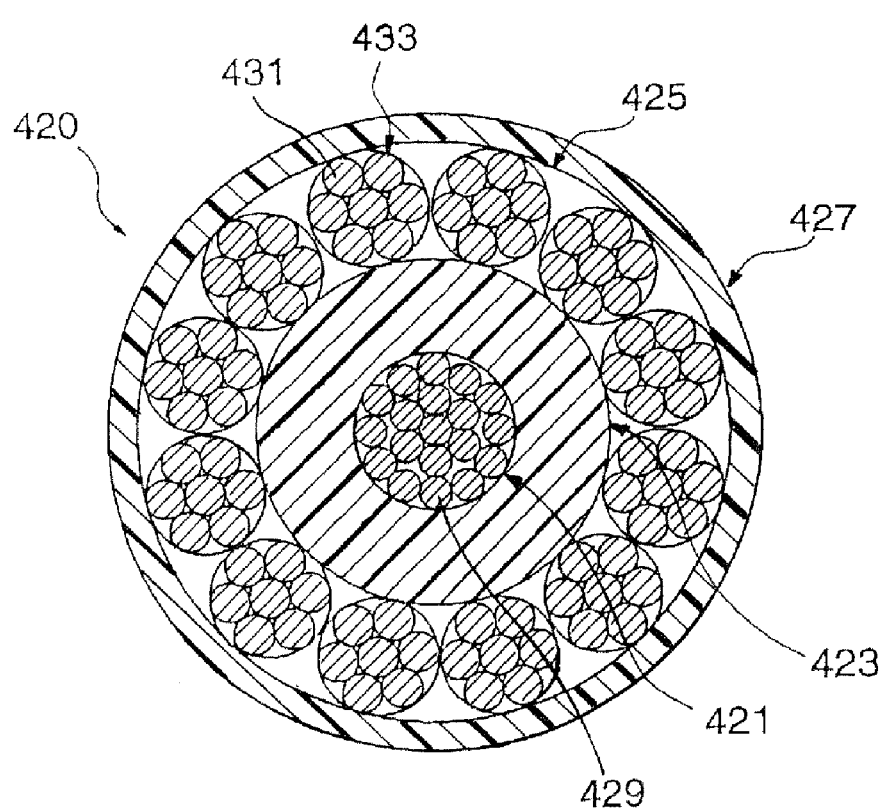
FIG. 16 is a cross-sectional drawing showing the power supply wire.

FIG. 16 is a cross-sectional drawing showing the power supply wire.

The power supply wire 420 comprises a core wire 421, an insulating layer 423 covering the core wire 421, an outer layer 425 covering the insulating layer 423 and an outermost insulating layer 427 covering the outer layer 425.

The core wire 421 is made such that plural strands 429 made of copper alloy having high strength and high conductivity are stranded. For such copper alloy having high strength and high conductivity, a strand made of alloy of copper and silver produced by Showa Electric Wire & Cable Co., Ltd. may be used, as same for the electrical apparatus suspension unit of the FIG. 1. In the embodiment, the core wire 421 is made such that plural (for example, 19) strands 429 are stranded. The core wire 421 has cutting resistant strength of 54.8 kg and current of 0.6 SQ at a rated current of 6 A (100V600 W).

The insulating layer 423 made of nylon covers the core wire 421 with a constant thickness.

The outer layer 425 is made such that plural (for example, 12) stranded wires 433 are braided around the insulating layer 423. The stranded wire 433 is made such that plural (for example, 7) copper wires 431 are stranded. The copper wire 431 may be made of copper alloy having high strength and high conductivity same as the core wire 421.

The outermost insulating layer 427 covers the outer layer 425 with a constant thickness. As the outermost insulating layer 427, for example, an insulating tube made of tefron (trade mark) having a thickness of 0.4 mm may be used.

In such type of the power supply wire 420, a current flows through both of the core wire 421 and the outer layer 425. And, one of the core wire 421 and the outer layer 425 serves as a voltage-applied conductor cable and another thereof serves as a grounded conductor cable. Since an induction current generated in conducting the core wire 421 is canceled by an induction current generated in conducting the outer layer 425, heat generation both in the insulating layer 423 and the outermost insulating layer 427 is prevented, whereby it can be used in safety. The power supply wire 420 has cutting resistant strength of 300 Kg. In this embodiment, although the outer layer 425, made of copper apply having high strength and high conductivity, has cutting resistant strength smaller than that made of stainless steel, there is no problem in the practical use.

As shown in FIG. 15, the power supply wire 420 is divided into a wire core terminal and an outer layer terminal at the lower end. Each of the terminals is connected to the terminal 11 of the lighting apparatus 3. And, the power supply wire 420 is divided into a wire core terminal and an outer layer terminal at the upper end. Each of the terminals is connected to a plug 440, which is mounted the wiring terminal 13 fixed on the ceiling.

As described above, a single power supply wire allows suspending the lighting apparatus and also supplying power thereto. Accordingly, such the wire can be used for various applications such as a pendant light as shown in the figure.

Figure 17:
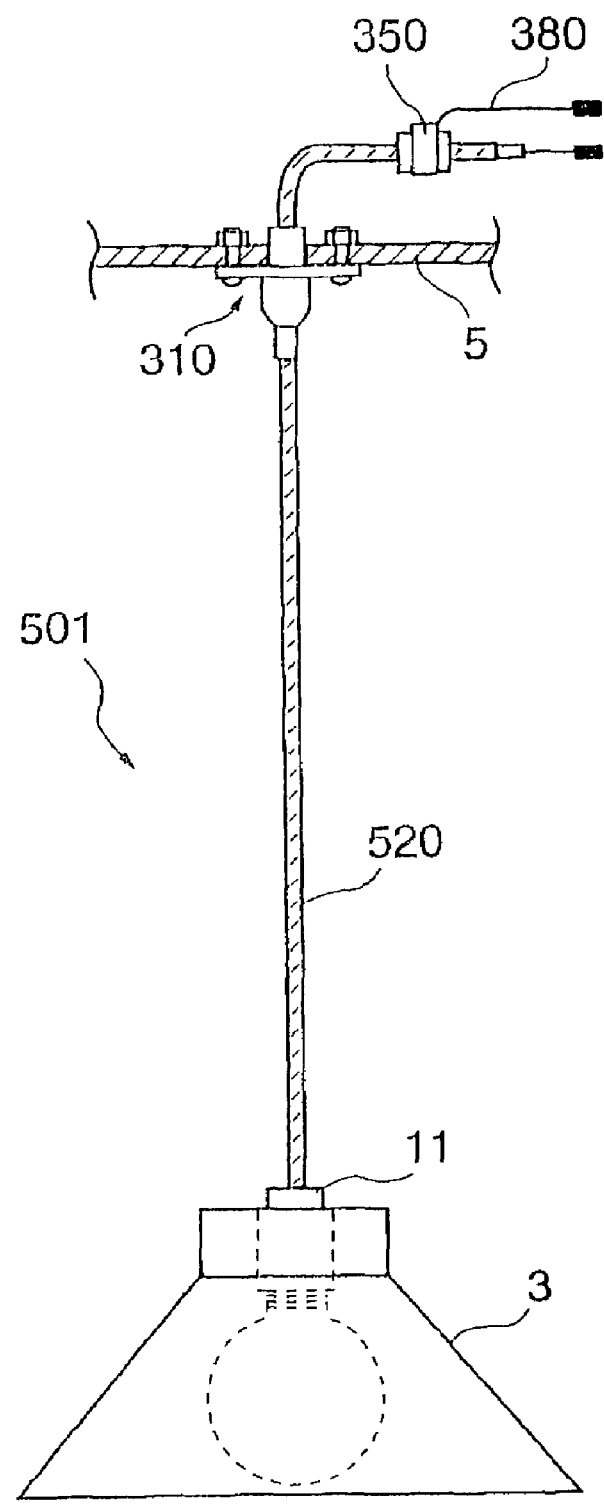
FIG. 17 is a drawing showing a structure of an electrical apparatus suspension unit according to the fifth embodiment of the present invention.

FIG. 17 is a drawing showing a structure of an electrical apparatus suspension unit according to the fifth embodiment of the present invention.

The electrical apparatus suspension unit 501 suspends a lighting apparatus 3 from the ceiling by one power supply wire, similar to the unit of the FIG. 15. In this embodiment, however, the lighting apparatus 3 operates at low-volt (36V or lower, AC or DC) and has a working power of 12V60 W or lower than the apparatus of FIG. 15. And, in this embodiment, since a wiring terminal is not mounted on the ceiling, it is necessary to connect the upper end of the wire to a wiring terminal above the ceiling.

Figure 18:
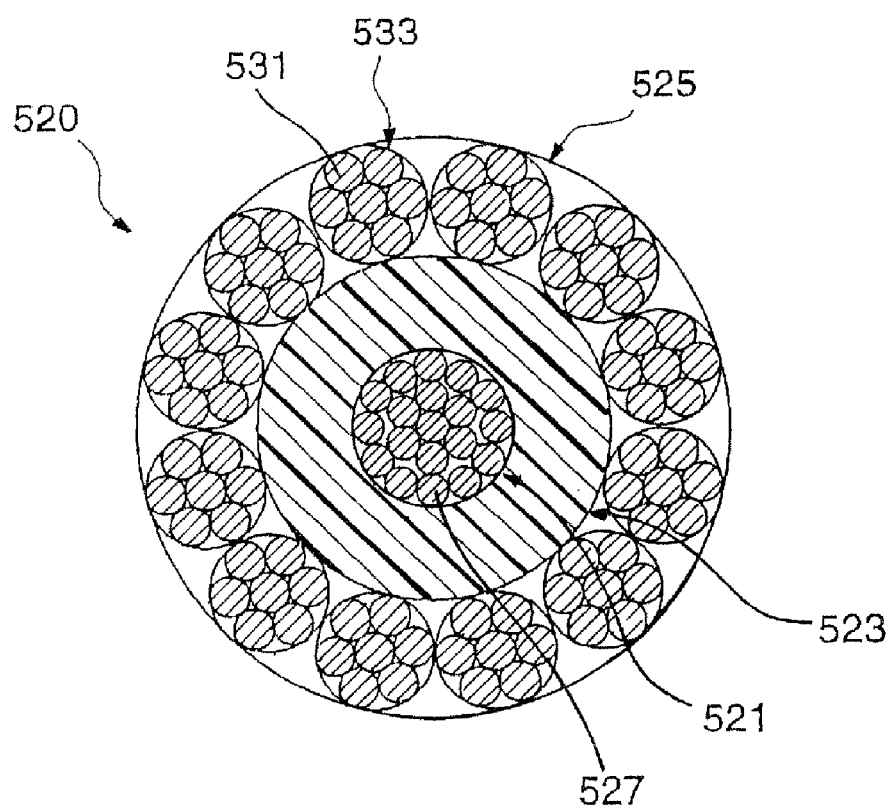
FIG. 18 is a cross-sectional drawing showing the power supply wire of the lighting apparatus suspension unit.

FIG. 18 is a cross-sectional drawing showing the power supply wire of the lighting apparatus suspension unit.

The power supply wire 520 comprises a core wire 521, an insulating layer 523 covering the core wire 521 and an outer layer 525 covering the insulating layer 523. In other words, the power supply wire 520 has a structure in which the outermost insulating layer 427 is removed from the power supply wire 420 (as shown in FIG. 16) of the device of FIG. 15.

The core wire 521 is made such that plural strands 527 made of copper alloy having high strength and high conductivity are stranded. For the copper alloy having high strength and high conductivity, a strand made of alloy of copper and silver produced by Showa Electric Wire & Cable Co., Ltd. may be used, as same for the electrical apparatus suspension unit of the FIG. 1. In the embodiment, the core wire 521 is made such that plural (for example, 19) the strands 527 are stranded. The core wire 521 has cutting resistant strength of 54.8 kg and current of 0.6 SQ at a rated current of 6 A (100V600 W).

The insulating layer 523 made of nylon insulant covers the core wire 521 with a constant thickness.

The outer layer 525 is made such that plural (for example, 12) stranded wires 533 are braided around the insulating layer 523. The stranded wire 533 is made such that plural (for example, 7) thin lines 531 made of stainless steel are stranded. The thin line 531 is made of the copper alloy having high strength and high conductivity same as the core wire 521.

In the power supply wire 520, as similar to the unit of FIG. 15, a current flows through the core wire 521 and the outer later 525. That is, one of the core wire 521 and the outer layer 525 serves as a voltage-applied conductor cable and another thereof serves as a grounded conductor cable. In the embodiment, a current flows through the outer layer 525 which is an outermost surface of the wire 520. However, since the lighting apparatus 3 of the embodiment operates at low voltage and therefore intensity of the current flowed through the outer layer 525 is small, there is very low possibility of the electric shock even if someone directly touches the wire 20.

For the upper holder, the wire grip 310 (as shown in FIG. 13) is used. The wire 520 is mounted to the ceiling by using the upper holder.

When the wire 520 is led out from the upper holder above the ceiling, either one of the core wire 521 or the outer layer 525 serves as a grounded conductor cable and another thereof serves as a voltage-applied conductor cable. The earth attachment 350 (as shown in FIG. 14) can be used in order to conduct the outer layer 525 directly to the wiring terminal. The earth attachment 350 allows the outer layer 525 to conduct not to an earth cable but to a conductor cable 380. And then, the conductor cable 380 may be connected to the wiring terminal.

Figure 19:
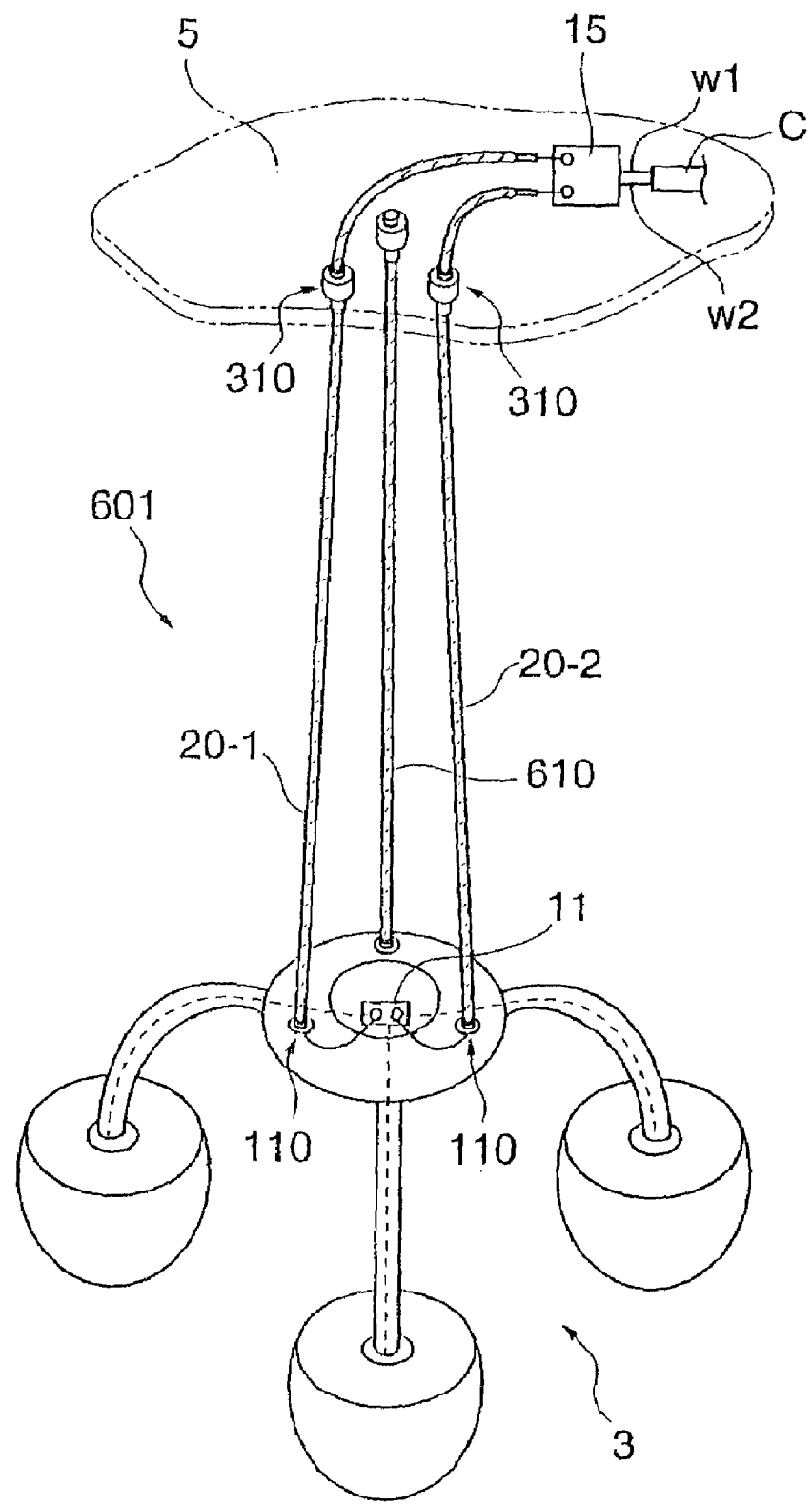
FIG. 19 is a drawing showing a structure of an electrical apparatus suspension unit according to the sixth embodiment of the present invention.

FIG. 19 is a drawing showing a structure of an electrical apparatus suspension unit according to the sixth embodiment of the present invention.

The electrical apparatus suspension unit 501 is available for suspension of a comparatively heavy lighting apparatus 3 such as a chandelier operated at an electrical power of 300 W. In order to suspend such heavy lighting apparatus, the electrical apparatus suspension unit 601 employs a reinforcing wire 610 in addition to two power supply wires 20-1 and 20-2.

The two power supply wires 20 have the same structure of the power supply wire 20 (as shown in FIG. 2) of the unit of FIG. 1. Each of the lower ends of the wires 20 is held to the lighting apparatus 3 by using the electrode support 110 (as shown in FIG. 10). And, each of the upper ends thereof is held to the ceiling 5 by the wire grip 310 (as shown in FIG. 13). The reinforcing wire 610 having the same appearance as the wire 20 is made of stainless steel. Both ends of the reinforcing wire 610 are held to the lighting apparatus 3 and the ceiling 5 by using the electrode support 110 and the wire grip 310.

As described above, in a case of a heavy lighting apparatus, an additional reinforcing wire allows obtaining enough withstand load. When more withstand load is required, more reinforcing wires may be used.

Figure 20:
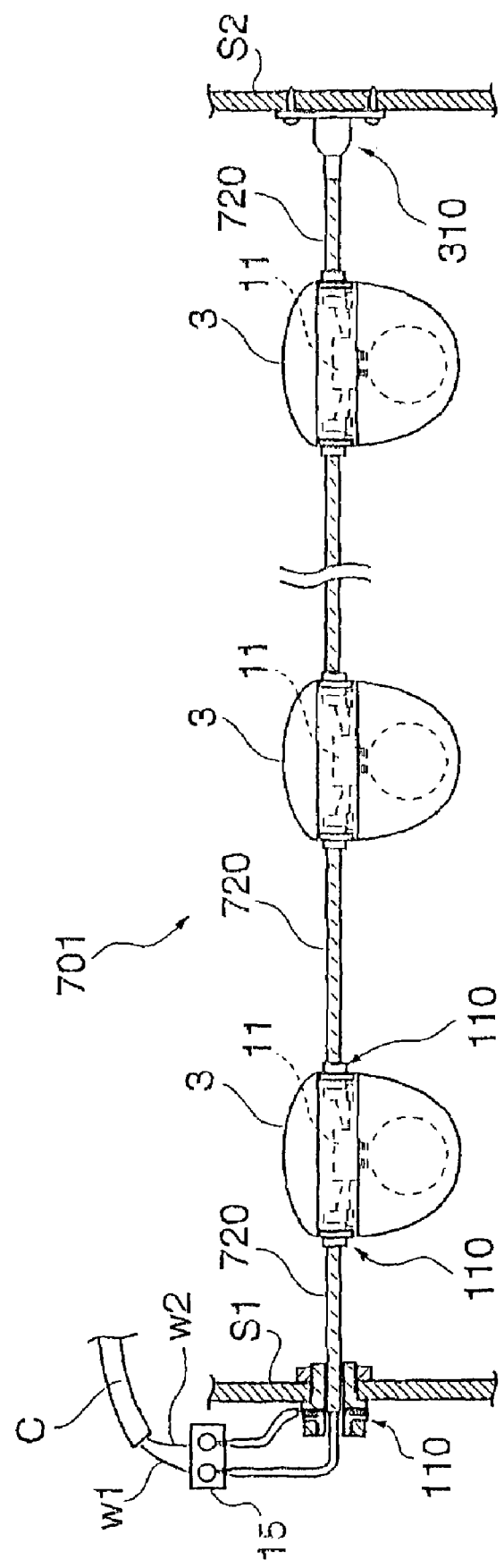
FIG. 20 is a drawing showing a structure of an electrical apparatus suspension unit according to the seventh embodiment of the present invention.

FIG. 20 is a drawing showing a structure of an electrical apparatus suspension unit according to the seventh embodiment of the present invention.

The electrical apparatus suspension unit 701 of this example connects plural lamps 3 serially between side walls S1 and S2. The unit 701 has plural power supply wires 720. As the power supply wire 720, the power supply wire (as shown in FIG. 16 and FIG. 18) in which the core wire and outer layer serves as a conductor cable can be used. In a case of the lamp 3 operated at low voltage, the power supply wire 520 (as shown in FIG. 18) which does not have the outermost layer can be used. And, in a case of the lamp 3 operated at a voltage of AC100V, the power supply wire 420 (as shown in FIG. 16) which has the outermost layer can be used.

The wire 720 is held to the lamp 3 using the electrode support 110 (as shown in FIG. 10). The wire 720 is led out from the electrode support 110 to inside of the lamp 3, and the core wire and the outer layer of the wire 720 are connected to the terminal 11 respectively inside the lamp 3.

And, the wire 720 is held to the side walls S1 and S2 by using the wire grip 310 (as shown in FIG. 13) and the electrode support 110 (as shown in FIG. 10). When the wire 720 is held to the side wall S1 by using the electrode support 110, both of the core wire and the outer layer which are divided through the electrode support 110 are connected to the terminal 15 connected to a F-cable C. Although the outer layer is connected to the earth cable 120 by using the electrode support 110 shown in FIG. 10, in this embodiment, the outer layer may be connected to a conductor cable which is connected to the terminal 15.

In addition, the lamp 3 may conduct through the wire grip 310 mounted on the side wall S2.

Figure 21:
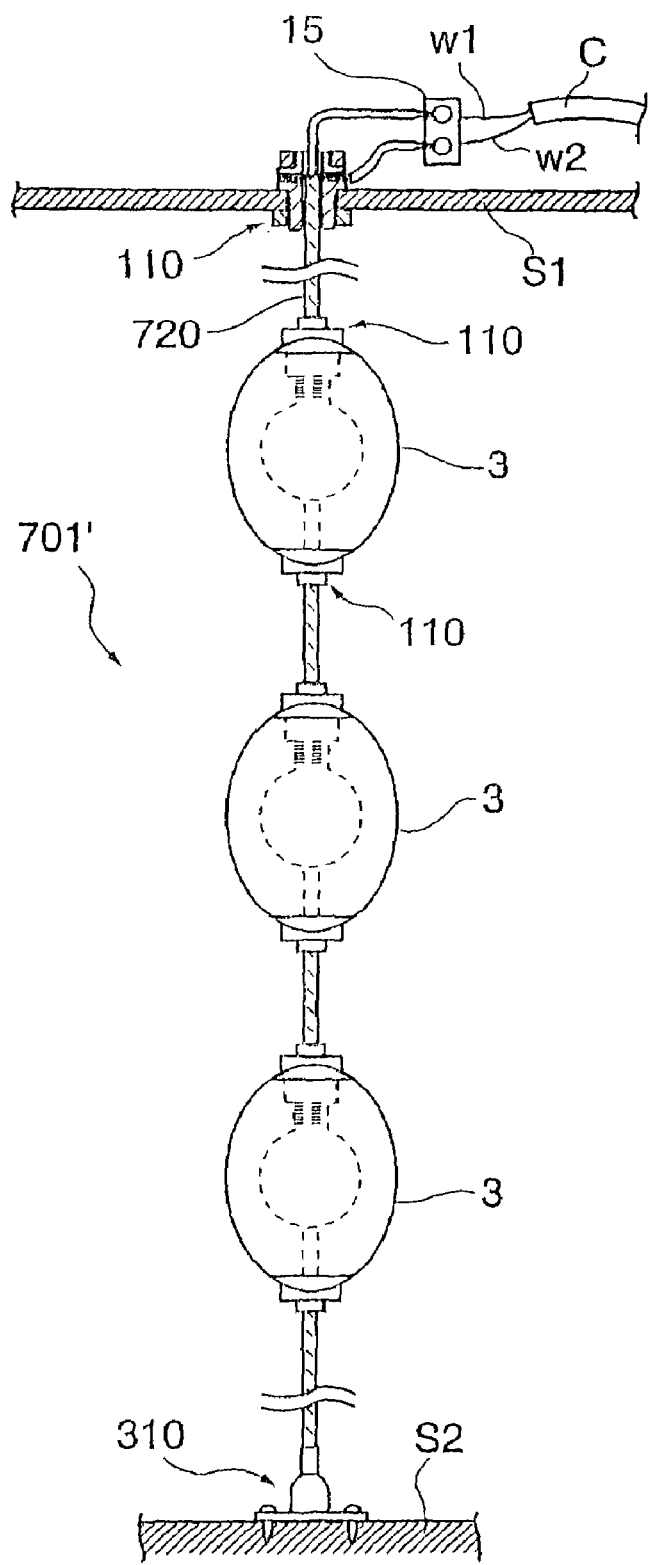
FIG. 21 is a drawing showing an electrical apparatus suspension unit according to the eighth embodiment of the present invention.

FIG. 21 is a drawing showing an electrical apparatus suspension unit according to the eighth embodiment of the present invention.

The electrical apparatus suspension unit 701' has the same structure as the electrical apparatus suspension unit 701 of FIG. 19 except that plural lamps 3 are connected serially between the ceiling S1 and a floor S2.

Figure 22:
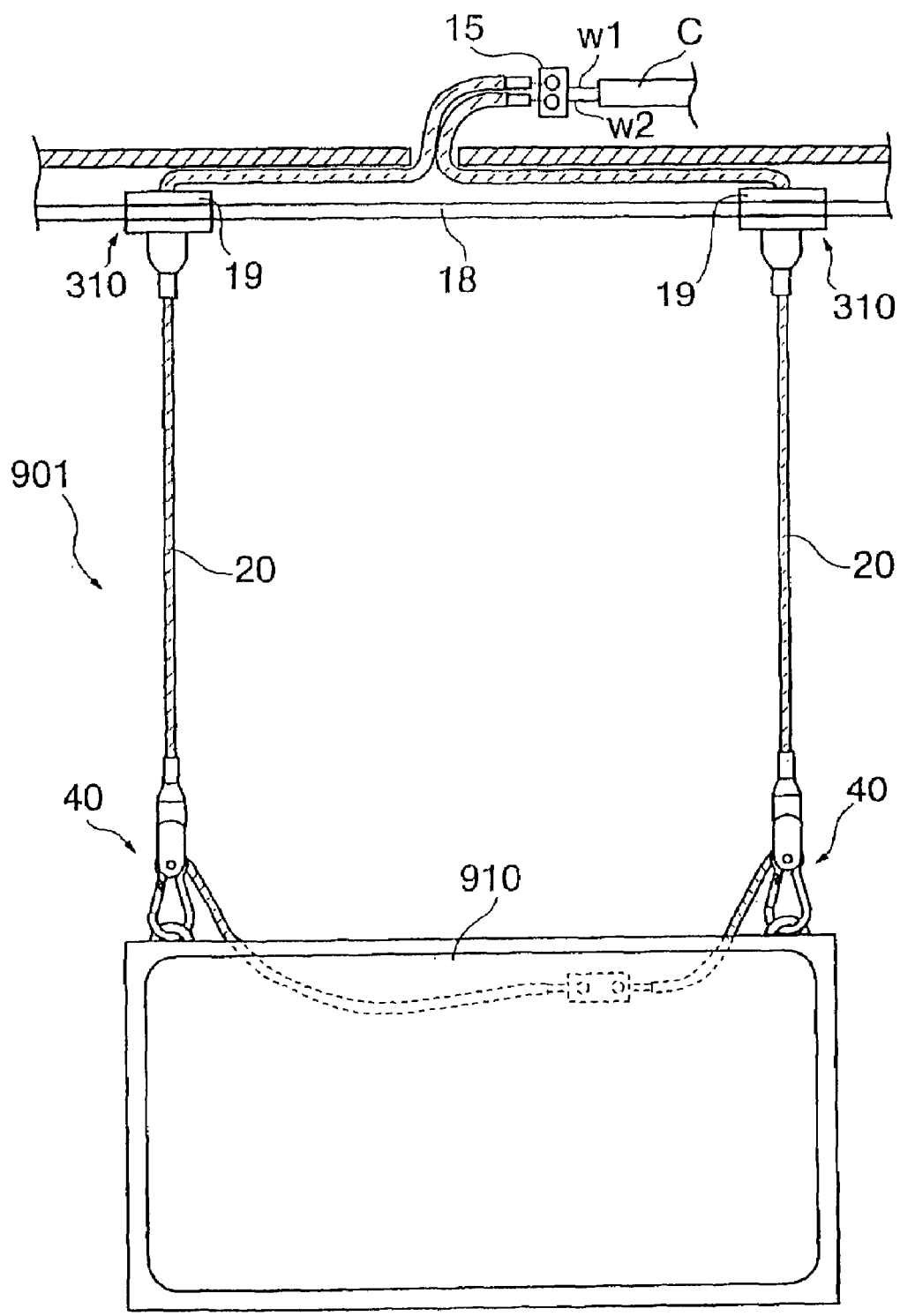
FIG. 22 is a drawing showing an electrical apparatus suspension unit according to the ninth embodiment of the present invention.

FIG. 22 is a drawing showing an electrical apparatus suspension unit according to the ninth embodiment of the present invention.

This type of the electrical apparatus suspension unit 901 is available for a suspension of an electrical apparatus 910 such as a thin type liquid crystal television and a sign display.

The electrical suspension unit 901 allows to suspend a heavy and flat electrical apparatus by using two power supply wires 20. As such power supply wire, the power supply wire 20 (as shown in FIG. 2) of the electrical apparatus suspension unit of FIG. 1 can be used. The lower ends of the wires 20 are held to the electrical apparatus 910 by using the wire grips 40 (as shown in FIG. 3 and FIG. 4).

In this embodiment, since a rail 18 with an attachment 19 slidable along the rail 18 is laid on a ceiling, it is possible to adjust a wire suspension position in the lateral direction. The rail 18 is installed between both side walls under the ceiling. To the rail 18, the attachment 19 is attached so as to slide along the rail 18. The upper ends of the wires 20 are securely held to the attachments 19 by using the wire grips 310 (as shown in FIG. 13). And, the wires 20 are led out from the attachment 19 upwardly, after through mounting openings of the ceiling 5, and connected to the terminal 15 connected to the F-cable C.

As described above, as a power supply wire, three kinds of wire (as shown in FIG. 2, FIG. 16 and FIG. 18) can be used, and as a wire holder, the wire grip 40 (as shown in FIG. 3), the electrode support 110 (as shown in FIG. 10) and the wire grip 310 (as shown in FIG. 13) can be used. And, in order to conduct the power supply wire, the earth attachment 350 (as shown in FIG. 14) and the electrode support 110 can be used. By selecting an appropriate power supply wire, wire holder and the like among these, it is possible to suspend an electrical apparatus such as a lighting apparatus in various forms.

Next, another embodiment of the present invention will be explained.

This embodiment shows a method for connecting the lower end of a power supply wire to an electrical apparatus (a lighting apparatus) and conducting a conductor cable of the power supply wire to a terminal of the electrical apparatus by using a lower holder (a wire grip with a hook). The power supply wire has substantially the same structure of the power supply wire 20 of FIG. 2 and comprises a core wire composed of stranded wire made of copper alloy having high strength and high conductivity, and an insulating layer covering the core wire and an outer layer covering the insulating layer. However, in this embodiment, the outer layer is composed of a braided wire such that a bundle of longitudinal strands and a bundle of transverse strands, which are made of nonmagnetic metal, are braided. Since such braided wire has contractility, it is slidable in the length direction of the wire. In addition, the power supply wire itself is flexible.

The lower holder is composed of a wire grip capable of being connected to the power supply wire at a desirable position and a hook (represented by 43 in FIG. 3) which is hooked to the hook formed on the lighting apparatus. The description of the hook is omitted.

FIG. 23 is a drawing showing a whole shape of the wire grip, FIG. 23(A) is a front drawing, FIG. 23(B) is a left side drawing and FIG. 23(C) is a plane drawing.

The wire grip 1001 is provided with a jig 1101 for inserting and connecting the power supply wire to the wire grip. The jig 1001 has an outer surface correspondent with the outer surface of the wire grip 1001.

The wire grip 1001 will be explained.

Figure 24:
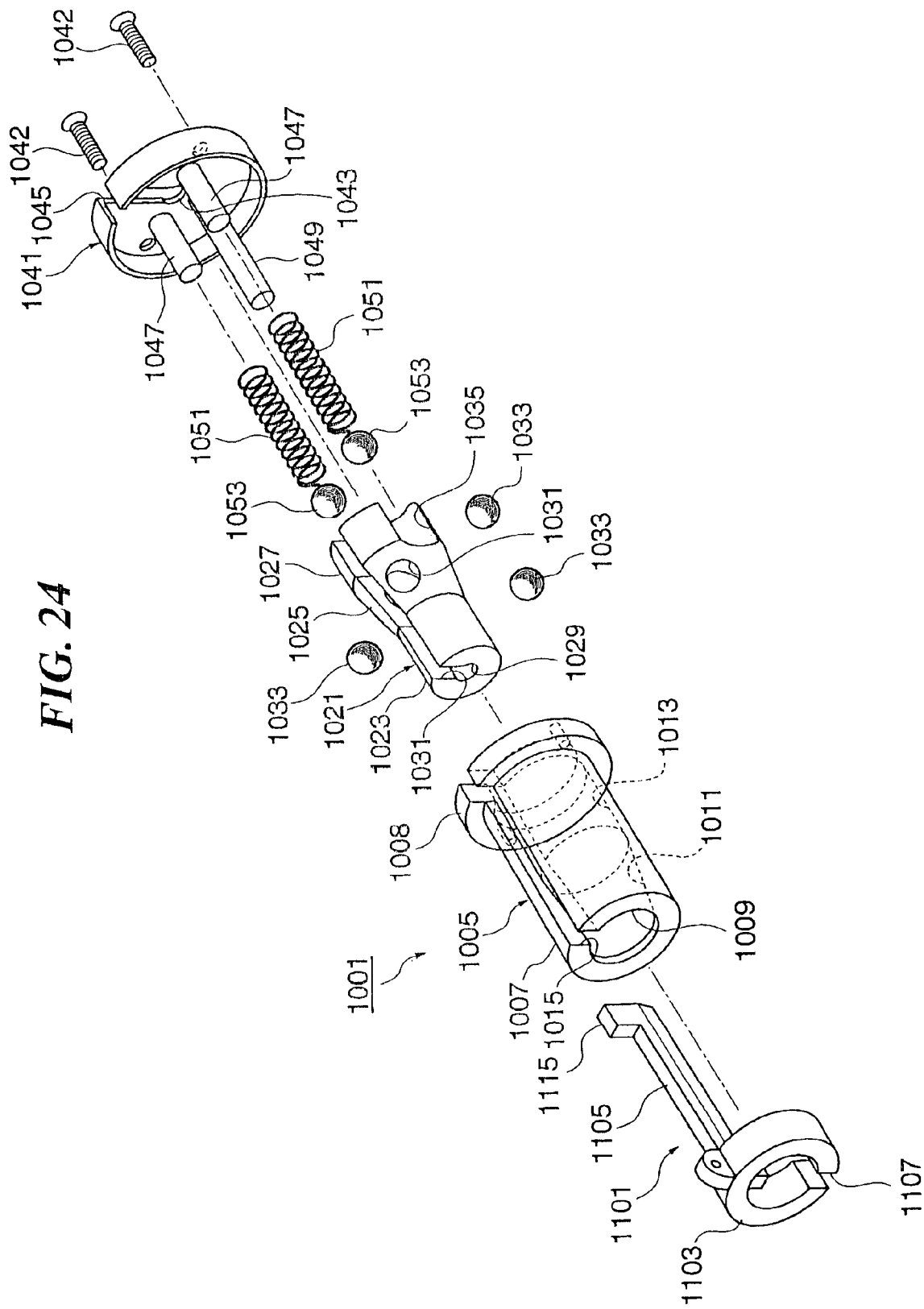
FIG. 24 is a drawing showing a structure of the wire grip.

FIG. 24 is a drawing showing a structure of the wire grip.

Figures 25A, 25B:
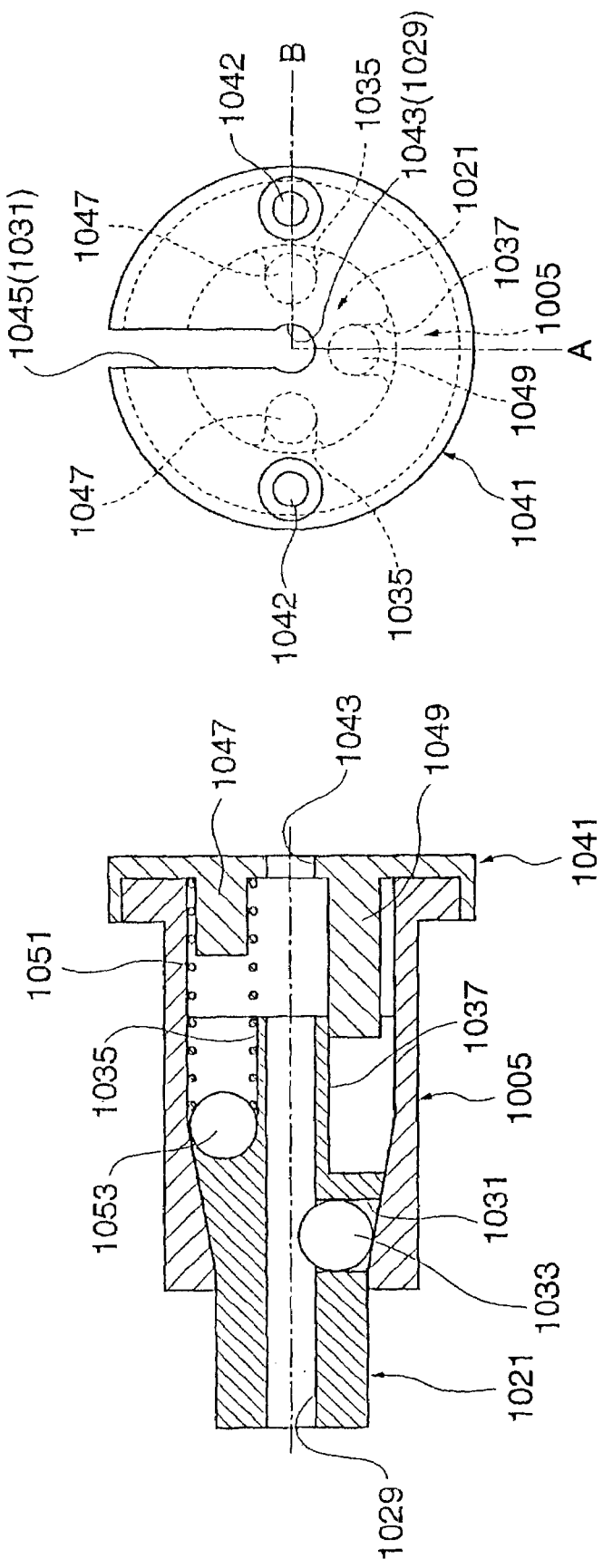

FIG. 25 is a drawing showing a part of the wire grip, FIG. 25(A) is a side drawing and FIG. 25(B) is a cross-sectional drawing crossed by A-B.

The wire grip 1001 is provide with an outer sleeve 1005, an inner sleeve 1021, plural balls 1033, a spring 1051 and a spring retainer 1041 and has almost the same function of the wire grip 41 of the FIG. 5.

The outer sleeve 1005 has a cylindrical portion 1007 and a flange portion 1008, and has an inner sleeve insertion bore 1009 on the central axis thereof. The inner sleeve insertion bore 1009 has a tapered inner surface 1011 which is tapered toward the end thereof and a cylindrical inner surface 1013.

The outer sleeve 1005 is formed with a slotted groove 1015 communicated the outer surface of the outer sleeve 1005 with the inner sleeve insertion bore 1009. The slotted groove 1015 extends in the full length of the outer sleeve 1005.

The inner sleeve 1021 is inserted in the inner sleeve insertion bore 1009 of the outer sleeve 1005, and has a small-diameter cylindrical portion 1023, a large-diameter cylindrical portion 1027 and a tapered portion 1025 which is tapered from the outer-diameter portion 1029 to the small-diameter portion 1023. The inner sleeve 1021 has a wire-insertion bore 1029 for inserting the wire therethrough on the central axis thereof.

The inner sleeve 1021 is formed with a slotted groove 1031 communicated the outer surface thereof with the wire-insertion bore 1029. The slotted groove 1021 extends in the full length of the inner sleeve 1021.

The tapered portion 1021 is formed with three ball-set bores 1031 extending in a perpendicular direction of the wire-insertion bore 1029 (in a diametric direction) between the tapered outer surface and the wire-insertion bore 1029. The ball-set bores 1031 are arranged at spaced positions (120°) around the axis of the wire-insertion bore 1029. In each of the ball-set bores 1031, a ball 1031 is received. The balls 1031 are made of electrical insulating material (for example, hard plastic (engineer plastic such as nylon and delrin) and ceramics (for example, alumina)). Each of the ball-set bore 1031 has a diameter added α (for example, 0.1 mm) to the diameter of the ball 1033 and a length slightly shorter than the diameter of the ball 1033. Accordingly, when each of the balls 1033 is received in each of the ball-set bores 1031, each of the bolls 1033 is protruded to the wire-insertion bore 1029.

The large-diameter cylindrical portion 1027 is formed with two spring receiving grooves 1035 and a guide groove 1037 (as shown in FIG. 25). As described later, in each of the spring receiving grooves 1035, the spring which biases the inner sleeve 1021 in the axis direction of the wire-insertion bore 1029 is received. And, in the guide groove 1037, a straight shank for guiding the inner sleeve 1021 straightforward is received. Each of the spring receiving grooves 1035 and the guide groove 1037 extend from the end surface of the large-diameter portion 1027 in the length direction of the inner sleeve 1021. As shown in FIG. 25(A), each of the spring receiving grooves 1035 are arranged on both side of the slotted groove 1031 at a central angle of 90° around the axis of the inner sleeve. And, the guide groove 1037 is arranged on the opposite side of the slotted groove 1031 at a central angle of 180° around the axis of the inner sleeve. The spring receiving grooves 1035 have a length slightly shorter than that of the guide groove 1037. And, each of the grooves has a semispherical bottom surface. In addition, the spring receiving groove 1035 has a semispherical upper end surface.

As shown in FIG. 25, the spring retainer 1041 has a wire-insertion bore 1043 at the central thereof. The spring retainer 1041 is formed with a slotted groove 1045 from the outer surface thereof to the wire-insertion bore 1043.

The spring retainer 1041 is formed on the inner surface (the surface on the side of the outer sleeve) with two spring supporting pins 1047 and a straight shank 1049 extending in the length direction. A spring 1051 is inserted onto each of the spring receiving pins 1047, and a ball 1053 is received on the upper end of each spring 1051. The spring receiving pins 1047 have a length slightly shorter than that of the straight shank 1049. The spring receiving pins 1047 are arranged on both side of the slotted groove 1045 at a central angle of 90° around the axis of the spring retainer 1041. And the straight shank 1049 is arranged on the opposite side of the slotted groove 1045 at a central angle of 180° around the axis of the spring retainer 1041. Thus, when the spring retainer 1041 and the inner sleeve 1021 are positioned such that the slotted groove 1045 are aligned with the slotted groove 1031 around the axes thereof, each of the spring receiving pins 1047 is positioned in the spring receiving groove 1035, and the straight shank 1049 is positioned in the guide groove 1037.

The spring retainer (a cap) 1041 is fixed to the flange portion 1008 of the outer sleeve 1005 by screws 1042 so that the slotted groove 1045 of the spring retainer 1041 is aligned with the slotted groove 1015 of the outer sleeve 1005 around the axis thereof. Thus, the slotted grooves 1045 of the spring retainer 1041 is communicated with both of the slotted grooves 1031 and 1015 of the inner sleeve 1021 and the outer sleeve 1005, respectively, each other. The communicated slotted grooves are formed between the outer surface of the wire grip 1001 and the wire-insertion bore 1029.

When the spring retainer 1041 is fixed to the flange portion 1008 of the outer sleeve 1005, the spring receiving pins 1047 to which the springs 1051 are inserted are positioned in the spring receiving grooves 1035 of the inner sleeve 1021. And, each of the spring 1051 is contacted to the semispherical end surface of the spring receiving groove 1035 of the inner sleeve 1021 via the ball 1053, resulting in forcing the inner sleeve 1021 with respect to the spring retainer 1041 by the spring 1051. At this time, the inner sleeve 1021 is forced straightforward along the straight shank 1049, resulting in that the tapered surface 1025 of the inner sleeve 1021 is contacted with the tapered inner surface 1011 of the outer sleeve 1005. As a result, the balls 1033 received in the ball-set bores 1031 of the inner sleeve 1021 are pressed by the tapered inner surface 1011 of the outer sleeve 1005 at the outside surface thereof, whereby the inside surfaces of the balls 1033 are protruded in the wire-insertion bore 1029. This causes the outer layer of the power supply wire inserted through the wire-insertion bore 1029 to be pressed by the balls 1033, enabling the wire to be held by the wire grip 1001. At this time, the balls 1033 are caught on meshes of the braided wire of the outer layer of the wire and also tension applied the mashes causes the meshes to be contracted radially, resulting in increasing the gripping force.

In order to release the wire from the wire grip 1001, the inner sleeve 1021 is pressed toward the spring retainer 1041 against the biasing force of the spring 1051. This causes the tapered outer surface 1025 of the inner sleeve 45 to be moved backwardly from the state in which the tapered outer surface 1025 is contacted to the tapered inner surface 1011 of the outer sleeve 1005. As a result, a clearance is left between the tapered inner surface 1011 of the outer sleeve 1005 and the tapered outer surface 1025 of the inner sleeve 1021, in other word, outside of the tapered outer surface 1025 of the inner sleeve 1021. This enables the balls 1033 received in the ball-set bores 1031 to move outwardly, resulting in that the force by which the wire 20 is gripped disappears or becomes weak. Then, the wire 20 can freely slide upwardly and downwardly.

In addition, since the balls 1033 of the wire grip 1001 are made of electrical insulating material, even if the balls 1033 will be bite into the insulating layer between the meshes of the outer layer, insulation performance of the core wire of the wire can be maintained.

When the power supply wire would have a certain degree of rigidly, the wire can be inserted through the wire-insertion bore 1029 of the wire grip 1001 with the end in the lead. However, when the power supply wire made of a braided wire would be inserted through the wire-insertion bore 1029 with the end in the lead, it is necessary to use a wire which has a predetermined length and is terminated with a cap. Accordingly, when the power supply wire with the outer layer made of a braided wire is held to the wire grip, the terminating treatment after cutting off the wire at the predetermined length is required. Therefore, if changing the length of the wire during installation work is necessary, in a case in which the height of the installation location goes wrong, inconveniences happen.

Consequentially, in the wire grip 1001, the wire is pushed into the wire-insertion bores 1029 and 1043 through the slotted grooves 1015, 1031 and 1045 at the intermediate portion of the wire by using a jig 1101.

Figure 26A:
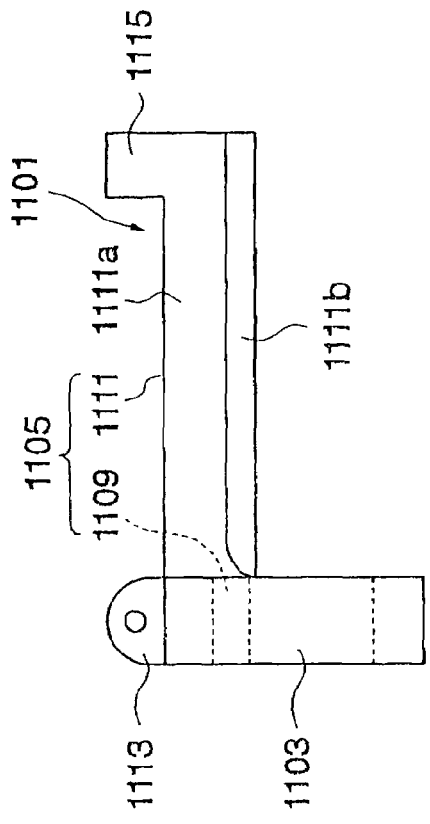
Figure 26B:
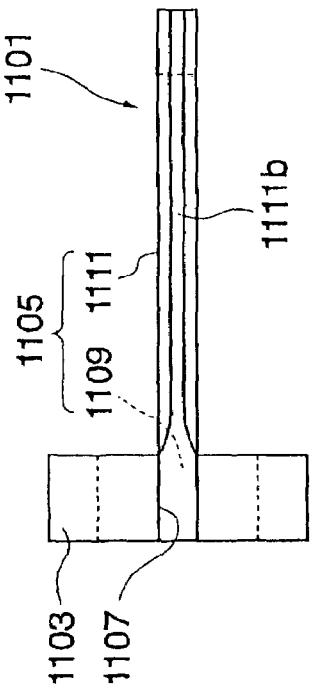
Figure 26C:
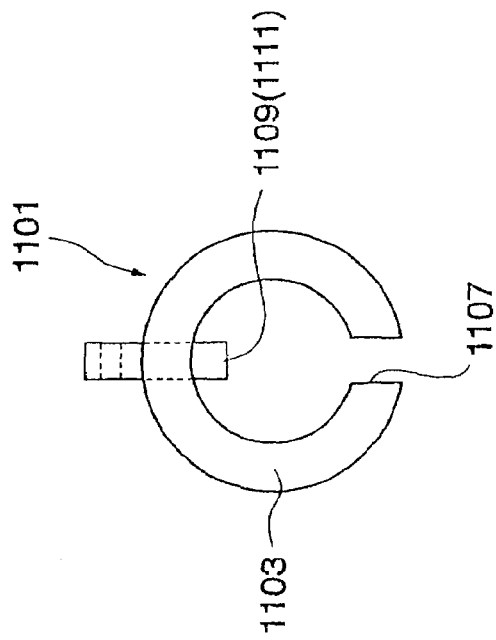

FIG. 26 is a drawing showing a structure of the jig, FIG. 26(A) is a front drawing, FIG. 26(B) is a bottom plane drawing, and FIG. 26(C) is a side drawing.

The jig 1101 works such that the inner sleeve 1021 is pressed toward the outer sleeve 1005 so as to communicate the wire-insertion bore 1029 with the outer surface of the wire grip and also the wire is pushed into the wire-insertion bore 1029. The jig 1101 has a ring-shaped portion (a ring portion) 1103 for pressing the inner sleeve 1021 in an opposed direction to the biasing direction of the spring 1051 and a strip portion 1105 extending the ring portion for pushing the wire into the wire-insertion bore through the slotted grooves.

The ring portion 1103 has an inner surface and an outer surface. The ring portion 1103 has an outer diameter equal to the outer diameter of the cylindrical portion 1007 of the outer sleeve 1005 and an inner diameter equal to the outer diameter of the small-diameter portion 1023 of the inner sleeve 1021. The ring portion 1103 is formed with a wire-insertion slit 1107 between the outer and inner surfaces. The wire-insertion slit 1107 has a width wider than the diameter of the wire.

The strip portion 1105 has a proximal section 1109 projecting inwardly from the inner surface of the ring portion 1103 and a body section 1111 extending from the end surfaces of the ring portion 1103 and the proximal section 1109 perpendicular to the ring portion 1103. That is, as shown in FIG. 26(C), in side view, the proximal section 1109 and the body section 1111 project in the radial direction of the ring portion 1103. The body section 1111 has a length equal to the length of the slotted groove 1015 of the outer sleeve 1005. The strip portion 1105 has a width equal to the width of the slotted groove 1015. The proximal portion 1109 has cross section of rectangle. The body section 1111 has an outside portion 1111*a* of a square cross-sectional shape and an inside portion 1111*b* of a tapered cross-sectional shape.

The ring portion 1103 is formed with a hook 1113 to which a string for tethering the jig 1101 to the wire grip is connected, as described later. And, the strip portion 1105 is formed with a projection 1115 at the tip thereof.

Next, the handling method of the jig will be explained.

FIG. 27 and FIG. 28 are front cross-sectional drawings showing the handling method of the jig.

Figure 27A:
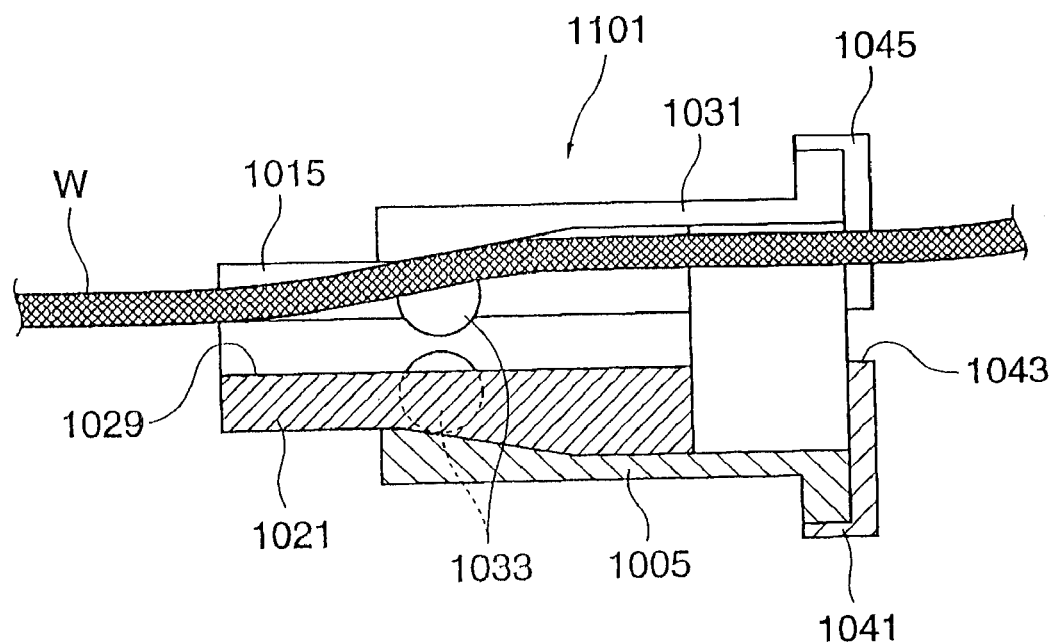

First, as shown in FIG. 27(A), the intermediate portion of the wire W is fitted into the slotted grooves 1015, 1031 and 1045 of the wire grip 1001 until the wire W is contacted to the balls 1033 protruded into the wire-insertion bore 1029.

Figure 27B:
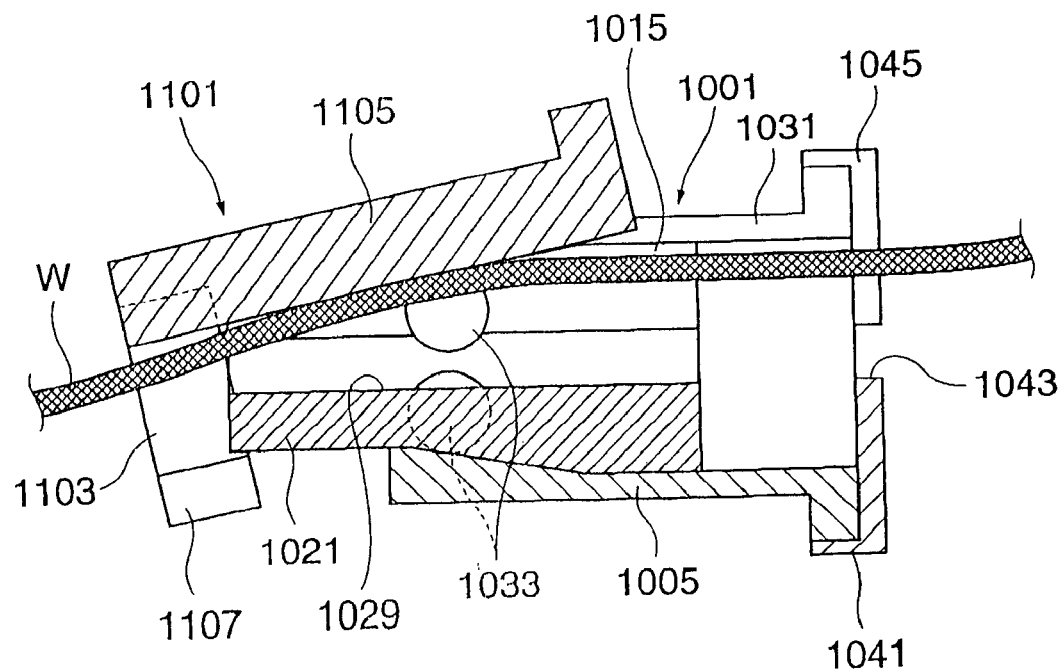

Then, as shown in FIG. 27(B), the jig 1101 is positioned such that the ring portion 1103 is placed on the side of the inner sleeve 1021, and the wire W is passed into the ring portion 1103 through the wire-insertion slit 1107. Next, the strip portion 1105 is positioned on the slotted grooves 1015 and 1031. At this time, since the wire W is contacted to the balls 1033, the strip portion 1105 is contacted to the wire W and therefore is not completely fitted into the slotted grooves. So, as shown in the figure, the jig 1101 is slanted with respect to the wire grip 1001. And, the ring portion 1103 is fitted onto the lower portion of the inner sleeve 1021, and the strip portion 1105 extends obliquely from the ring portion such that the body section 1111 is partially fitted into the slotted groove 1015 of the inner sleeve 1021 and contacted to the wire W in the slotted groove 1015.

Figure 28A:
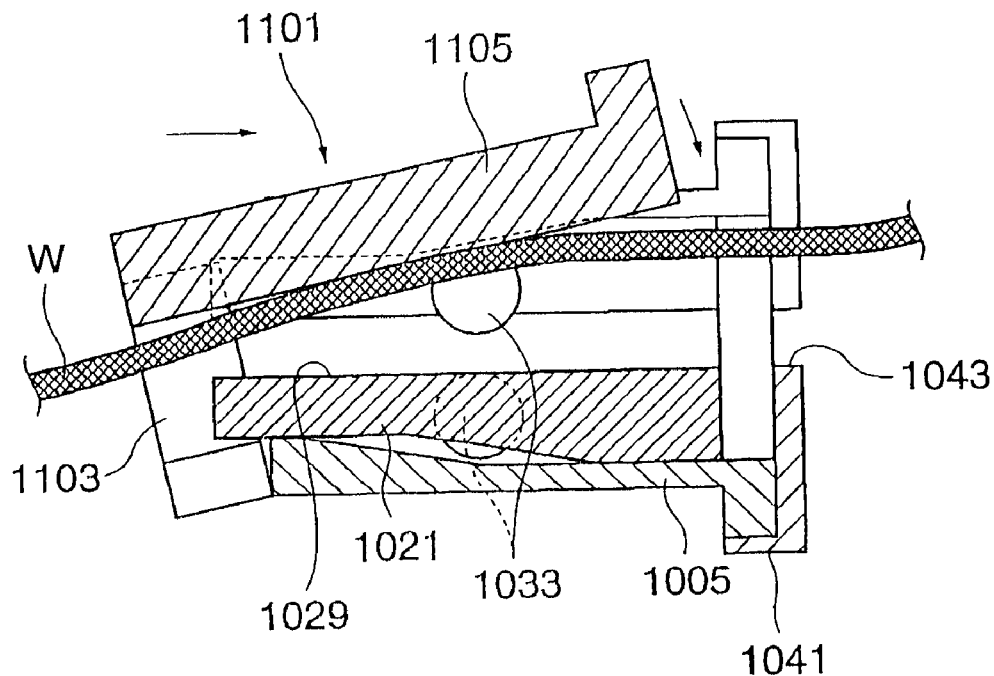
Figure 28B:
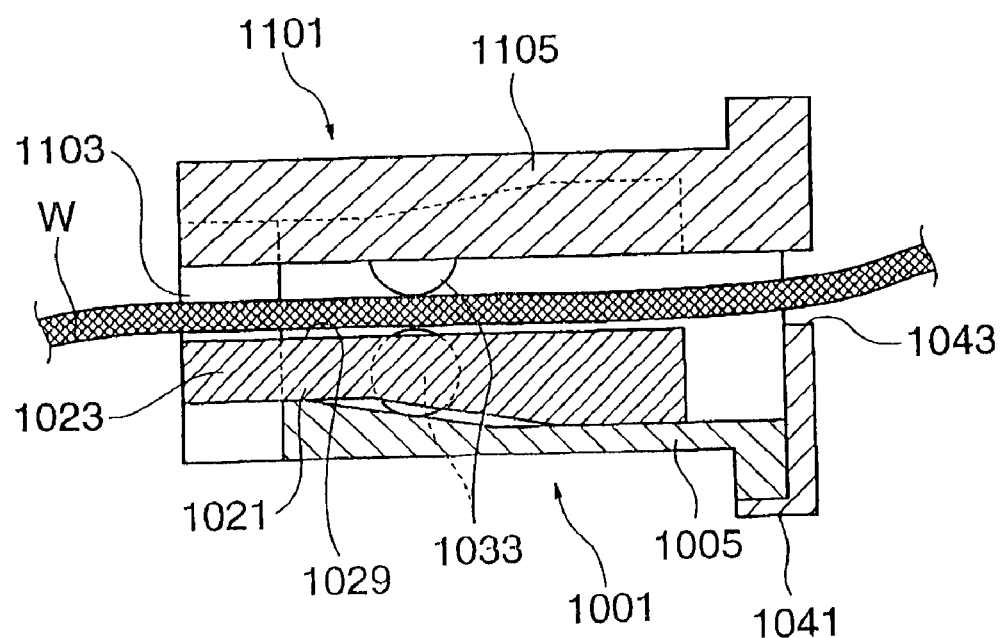

Then, the ring portion 1103 of the jig 1101 is pressed toward the wire grip 1001. This causes the inner sleeve 1021 to be pressed with respect to the outer sleeve 1005, causing the balls 1033 to be moved outwardly in the inner sleeve. Further pressing the ring portion 1103 toward the wire grip 1001 causes the wire W to be pushed by the strip portion 1105 and fitted into the wire-insertion bore 1029 through the slotted groove 1015. As shown in FIG. 28(A), when the jig 1101 is pressed until the ring portion 1103 is contacted on the outer sleeve 1005, the jig 1101 turns clockwise in the figure. Next, as shown in FIG. 28(B), the ring portion 1103 is perfectly fitted onto the small-diameter portion 1023 of the inner sleeve 1021 and the strip portion 1105 pushes the wire W into the wire-insertion bore 1029. At this time, the wire W can be perfectly inserted into the wire-insertion bore 1029 by pressing the strip portion 1105 because the strip portion 1105 has the tapered inside portion 1111*b* capable of fitting into between the balls 1033. Then, when the force for pressing the inner sleeve 1021 is released, the inner sleeve 1021 is biased by the spring 1051, and as the result, the balls 1033 are protruded into the wire-insertion bore 1029, gripping the meshes of the outer layer of the wire W. This enables the wire W to be securely held to the wire grip 1001.

As shown in FIG. 28(B), since the jig 1101 has the same outer shape as the wire grip 1001, it is possible to maintain the jig 1101 fitted into the slotted grooves of the wire grip 1001. In this case, as described later, the jig 1101 is tethered to the wire grip 1101 or a surrounding member by using a string connected to the hook 1113 of the jig 1101.

A jig according to another embodiment will be explained.

Figure 29:
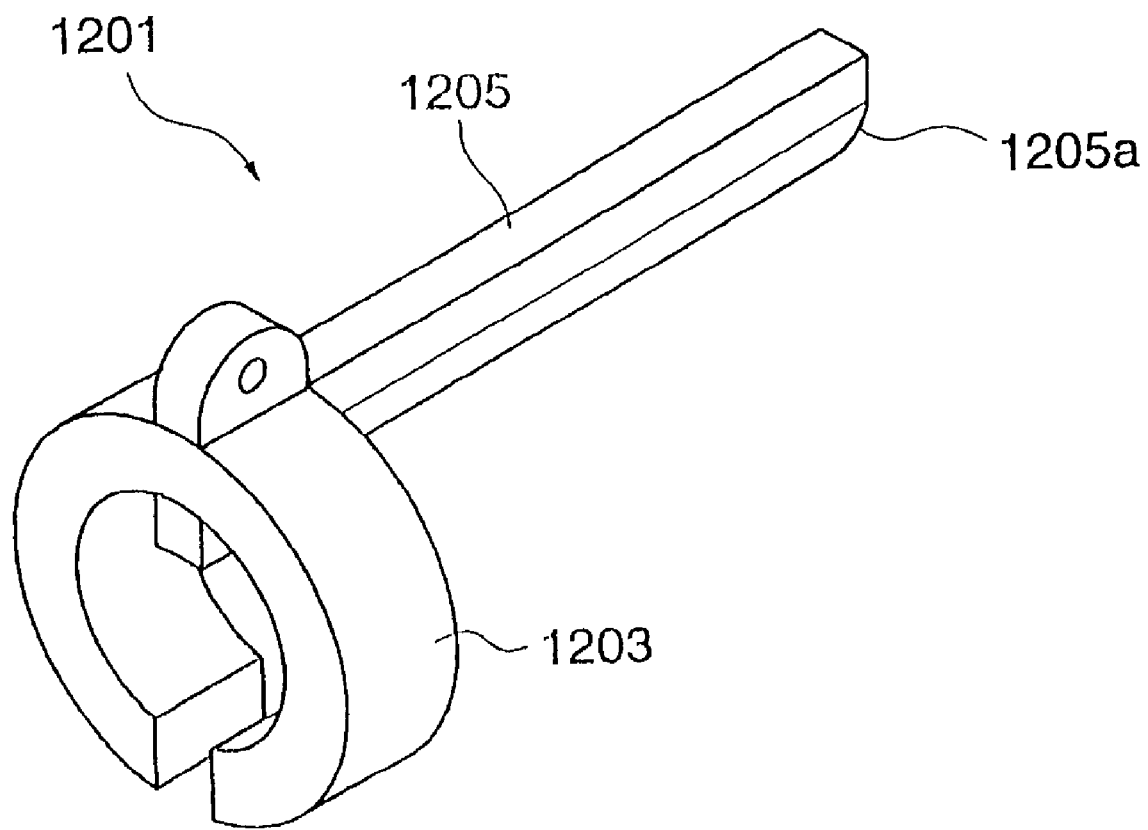
FIG. 29 is a drawing showing a structure of the jig according to another embodiment.

FIG. 29 is a drawing showing a structure of the jig according to another embodiment.

The jig 1201 in the embodiment has the same structure as the jig of FIG. 26 and has a ring portion 1203 and a strip portion 1205 except that the strip portion 1205 does not have a projection (represented by 1115 in FIG. 26). In addition, the strip portion 1205 has a rounded inner end 1205*a*. This allows smooth sliding of the strip portion 1205 with respect to the wire.

Next, a method for attaching the wire grip 1001 to an electrical apparatus will be explained.

Figure 30A:
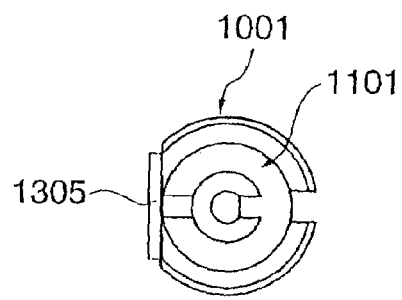
Figure 30B:
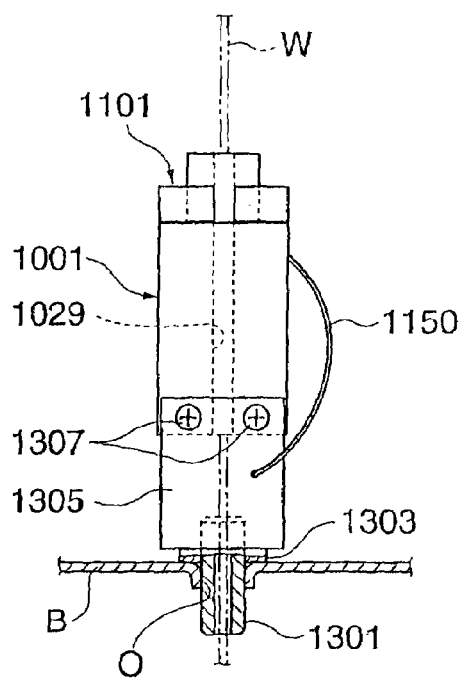
Figure 30C:
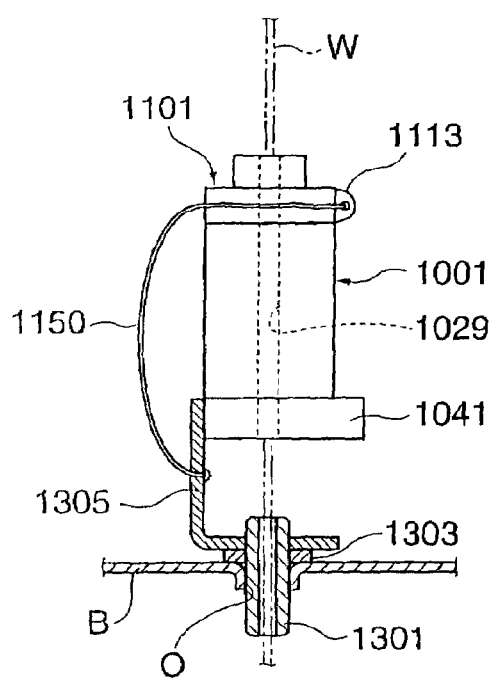

FIG. 30 is a drawing showing a state in which the wire grip is attached to the electrical apparatus.

In this case, the wire W is held to the base B of the lighting apparatus by using the wire grip 1001. In the wire grip 1001 of the embodiment, the outer sleeve and the spring retainer have a flattened side surface in the length direction, as shown in FIG. 30(A).

The lighting apparatus has the base B with a mounting opening through which a pipe 1301 is inserted. A L-shaped bracket 1305 is fixed to the pipe 1301 protruded over the base B via a washer 1303. The wire grip 1001 is mounted to the L-shaped bracket 1305 by screws 1307 such that the flattened side surface is abutted on the bracket 1305 with keeping the spring retainer 1041 down.

The jig 1101 is tethered to the bracket 1305 by a string 1150. Thus, the jig 1101 keeps being connected to the wire grip 1001 even after the wire W is held to the grip 1001. The jig 1101 may be also used when a suspension length of the wire is changed, in addition to when the wire is held to the grip. Accordingly, it is preferable that the jig is always prepared beside the grip. So, the jig 1101 is tethered to the bracket 1305 by using the string 1150, whereby the jig 1101 would not be lost, and it would not be necessary to prepare the jig again when the wire would be detached from the wire grip or the suspension length of the wire would be changed.

When the electrical apparatus will be suspended, first, the wire grip 1001 is held to the wire W suspended from the ceiling at a desired position (a desired height of the lighting apparatus) in a such manner as described above. Then, the wire grip 1001 is fixed to the bracket mounted to the base of the lighting apparatus. And, the wire W inserted into the wire-insertion bore of the wire grip 1001 is led therefrom, and after inserting through the pipe 1301, it is led to the terminal inside the lighting apparatus and cut off. Then, the wire W is treated such that the outer layer thereof is slid in the length direction so as to expose the insulating layer. And, the insulating layer is stripped by using a nipper so (as to expose the core wire to which the terminal of the conductor cable is connected.

Figure 31A:
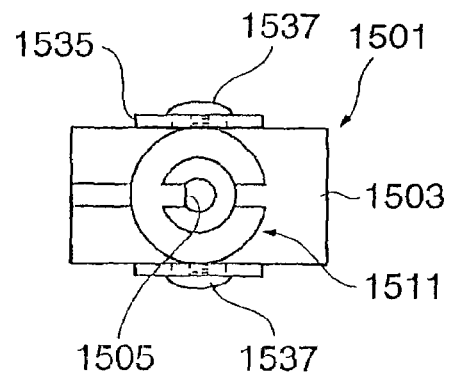
Figure 31B:
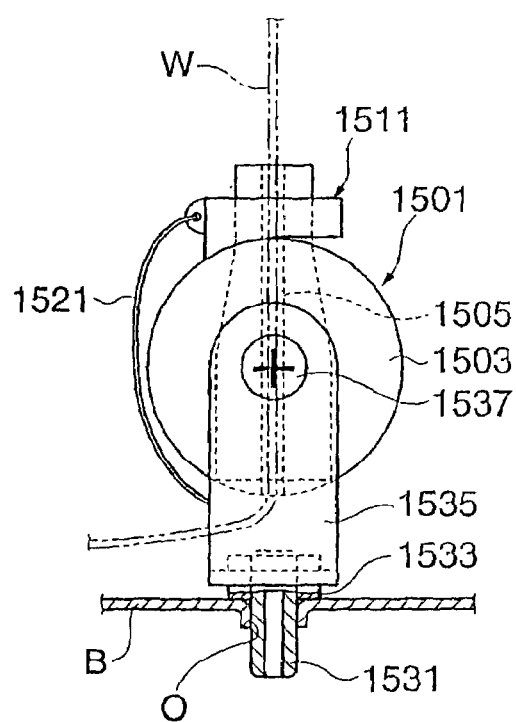
Figure 31C:
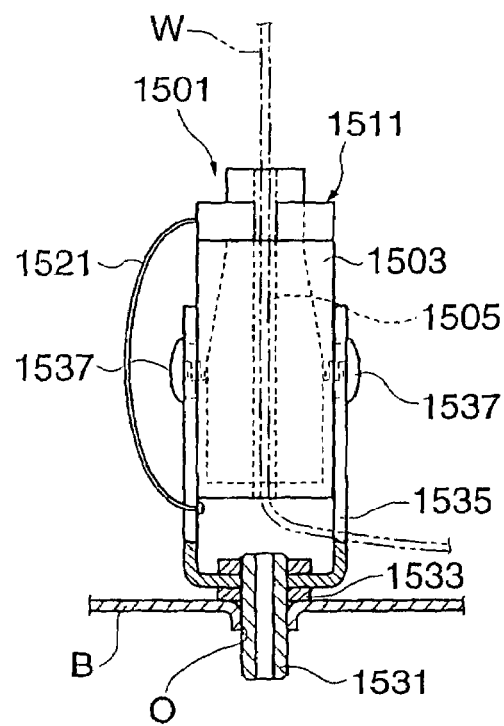

FIG. 31 is a drawing showing a state in which wire grip according to another embodiment is attached.

The wire grip 1501 in the embodiment has the same structure and function as the aforesaid wire grip 1001 except for the shape of the outer sleeve. The outer sleeve 1503, as shown in the figure, has a columned shape with a central axis thereof perpendicular to the axis of the wire-insertion groove 1505. Such shape of the outer sleeve enables to attach another member to the circular side surfaces of the outer sleeve easily. Accordingly, for example, when a shelf will be held at the intermediate portion of the power supply wire, after connecting the wire grip 1501 to the intermediate portion of the wire, an attachment for the shelf is mounted to the circular side surface of the outer sleeve by using a mounting member.

As similar to the aforesaid embodiment, the lighting apparatus has a base B with a mounting opening O through which a pipe 1531 is inserted. A bracket 1535 is fixed to the pipe 1531 protruded over the base B via a washer 1533. The bracket 1535 has a horseshoe shape comprising a bottom wall and side walls perpendicular to the bottom wall. The bracket 1535 is fixed to the pipe 1531 at the bottom wall. The wire grip 1501 is placed between the side walls of the bracket 1535 and fixed thereto at the side surface thereof.

In addition, the wire W, as shown in the embodiment, may be led laterally from the wire-insertion bore 1505 over the base B without inserting through the pipe 1531.

Also in the embodiment, the jig 1511 is tethered to the bracket 1501 by a string 1521.

Effect of the Invention

As described above, the present invention can provide a power supply wire capable of serving as power-supplying and also suspending an electrical apparatus with having high tensile strength. The power supply wire and a grip for connecting an electrical apparatus to the wire enables to provide an electrical apparatus suspension unit capable of suspending a heavy electrical apparatus such as a lighting apparatus, a liquid crystal display, a speaker and a microphone.

What is claimed is:

1. An electrical apparatus suspension unit comprising:
   a plurality of power supply wires, each comprising a core wire comprising stranded wires made of copper alloy having high strength and high conductivity, and an insulating layer covering said core wire;
   a lower holder gripping a lower end portion of each of said power supply wires, said lower holder being connectable to at least one hung member of an electrical apparatus; and
   an upper holder gripping an upper end portion of each of said power supply wires,
   wherein upper and lower ends of the core wires of at least two of said power supply wires are connectable to a terminal of said electrical apparatus and a power line, respectively.

2. An electrical apparatus suspending unit according to claim 1, wherein each of said power supply wires further comprises an outer layer which comprises stranded wires made of nonmagnetic metal, and which covers said insulating layer.

3. An electrical apparatus suspension unit according to claim 2, wherein each of said power supply wires further comprises an outermost insulating layer covering said outer layer.

4. An electrical apparatus suspension unit according to claim 3, wherein upper and lower ends of the outer layers of said at least two of said power supply wires are connectable to the terminal of said electrical apparatus and the power line, respectively.

5. A wire grip comprising:
   an inner sleeve having a wire-insertion bore for inserting a wire, a plurality of ball-set bores opened at both of said wire-insertion bore and an outer surface of said inner sleeve, and a tapered outer surface which is formed at a portion where said ball-set bores are formed;
   a plurality of balls received in said ball-set bores and protruding partially into said wire-insertion bore so as to be pressed to said wire;
   an outer sleeve having a tapered inner surface which is contacted with said tapered outer surface of said inner sleeve so as to press said balls inwardly; and
   a spring which biases said inner sleeve with respect to said outer sleeve in a direction in which the tapered outer surface is tapered down,
   wherein each of said inner sleeve and said outer sleeve has a slotted groove communicating with said wire-insertion bore, and
   wherein said wire grip further comprises a jig by which said wire is pushed into said slotted grooves.

6. A wire grip according to claim 5, wherein said jig comprises:
   a sleeve pressing portion which presses said inner sleeve in an opposite direction to a biasing direction of said spring, and
   a strip portion which extends from said sleeve pressing portion, and which pushes said wire into said slotted grooves.

7. A wire grip according to claim 5, wherein said balls are made of electrical insulating material.

8. A wire grip according to claim 7, wherein said balls are made of ceramics.

9. An electrical apparatus suspension method for suspending an electrical apparatus using a power supply wire comprising a core wire comprising stranded wires made of copper alloy having high strength and high conductivity, an insulating layer covering the core wire, and an outer layer comprising braided wires made of nonmagnetic metal and covering the insulating layer, wherein the electrical apparatus is securely held to said wire using a wire grip, the wire grip comprising:
   an inner sleeve having a wire-insertion bore for inserting said wire, a plurality of ball-set bores opened at both of said wire-insertion bore and an outer surface of said inner sleeve and a tapered outer surface which is formed at a portion where said ball-set bores are formed;
   a plurality of balls received in said ball-set bores and protruding partially into said wire-insertion bore so as to be pressed to said wire;
   an outer sleeve having a tapered inner surface which is contacted with said tapered outer surface of said inner sleeve so as to press said balls inwardly; and
   a spring which biases said inner sleeve with respect to said outer sleeve in a direction in which said tapered outer surface is tapered down,
   wherein said wire grip further comprises a jig for pushing said wire into slotted grooves, which are formed at said inner sleeve and said outer sleeve and communicated with said wire-insertion bore,
   wherein said method comprises fitting said wire into said slotted grooves from a side surface of said wire grip and pushing said wire into said slotted grooves using said jig so that said wire is held by said wire grip.

10. An electrical apparatus suspension method according to claim 9, said method further comprising:
    cutting said wire at a desirable length;
    sliding said outer layer from a cut end in a length direction so as to expose said insulating layer;
    stripping said insulating layer so as to expose said core wire; and
    connecting said core wire to a terminal of the electrical apparatus and pushing said slid outer layer into said slotted grooves.

* * * * *